(12) United States Patent
Erdl

(10) Patent No.: US 7,852,051 B2
(45) Date of Patent: Dec. 14, 2010

(54) CURRENT-LIMITING CIRCUIT AND METHOD FOR OPERATING THE CIRCUIT

(75) Inventor: Bernhard Erdl, Munich (DE)

(73) Assignee: PULS GmbH, Munich (DE)

( * ) Notice: Subject to any disclaimer, the term of this patent is extended or adjusted under 35 U.S.C. 154(b) by 0 days.

(21) Appl. No.: 12/611,673

(22) Filed: Nov. 3, 2009

(65) Prior Publication Data

US 2010/0109617 A1    May 6, 2010

Related U.S. Application Data

(63) Continuation-in-part of application No. 11/332,462, filed on Jan. 17, 2006, now abandoned.

(30) Foreign Application Priority Data

Jan. 18, 2005    (DE) .................. 10 2005 002 359

(51) Int. Cl.
*G05F 1/10* (2006.01)
(52) U.S. Cl. ..................................... 323/222
(58) Field of Classification Search ......... 323/222–225, 323/268, 271, 282–284, 908
See application file for complete search history.

(56) References Cited

U.S. PATENT DOCUMENTS

| | | | |
|---|---|---|---|
| 4,672,523 A | 6/1987 | Ari et al. | |
| 4,720,667 A | 1/1988 | Lee et al. | |
| 4,811,184 A | 3/1989 | Koninsky et al. | |
| 4,816,982 A | 3/1989 | Severinsky | |
| 4,974,141 A | 11/1990 | Severinsky et al. | |
| 5,233,287 A | 8/1993 | Lenk | |
| 5,375,032 A | 12/1994 | Hatakeyama et al. | |
| 5,383,082 A | 1/1995 | Nishizawa | |
| 5,422,562 A | 6/1995 | Mammano et al. | |
| 5,552,695 A | 9/1996 | Schwartz | |
| 5,793,191 A | 8/1998 | Elmore et al. | |

(Continued)

FOREIGN PATENT DOCUMENTS

DE    4116756    4/1992

(Continued)

OTHER PUBLICATIONS

Jul. 30, 2009 Notice of Allowance and Fees Due (U.S. Appl. No. 11/332,462).

(Continued)

*Primary Examiner*—Matthew V Nguyen
(74) *Attorney, Agent, or Firm*—Miles & Stockbridge P.C.; Eric G. King, Esq.; Michael A. Minter, Esq.

(57) ABSTRACT

A current-limiting circuit for limiting switch-on currents or transients includes a switch, a diode, an inductance, an input with a first connection and second connection, and an output with a first connection and second connection. The second connection of the input is connected via the switch to the junction of an inductance and the anode of a diode and via the inductance to the second connection of the output. The cathode of the diode is connected to the first connection of the input and to the first connection of the output. The switch is preferably an electronic switch controlled to provide clocked current limitation.

39 Claims, 16 Drawing Sheets

U.S. PATENT DOCUMENTS

| | | | |
|---|---|---|---|
| 5,834,924 A * | 11/1998 | Konopka et al. | 323/222 |
| 5,889,390 A | 3/1999 | Preis et al. | |
| 6,166,527 A | 12/2000 | Dwelley et al. | |
| 6,208,896 B1 | 3/2001 | Mulhauser | |
| 6,285,170 B1 | 9/2001 | Matsumoto et al. | |
| 6,348,781 B1 | 2/2002 | Midya et al. | |
| 6,445,165 B1 | 9/2002 | Malik et al. | |
| 6,552,498 B1 | 4/2003 | Prasad et al. | |
| 6,646,842 B2 | 11/2003 | Pan et al. | |
| 6,804,091 B2 | 10/2004 | Jenkins et al. | |
| 6,894,882 B2 | 5/2005 | Maru et al. | |
| 6,969,976 B1 * | 11/2005 | Broach et al. | 323/222 |
| 6,984,963 B2 | 1/2006 | Pidutti et al. | |
| 7,064,527 B2 | 6/2006 | Andragna | |
| 7,365,525 B2 * | 4/2008 | Zhou et al. | 323/282 |
| 2001/0036093 A1 | 11/2001 | Tanikawa et al. | |
| 2004/0196013 A1 | 10/2004 | Chen et al. | |
| 2005/0141158 A1 | 6/2005 | Sae-Ueng et al. | |

FOREIGN PATENT DOCUMENTS

| | | |
|---|---|---|
| DE | 37 84 960 T2 | 7/1993 |
| DE | 43 44 355 A1 | 12/1993 |
| DE | 299 23 111 U1 | 1/1999 |
| DE | 200 10 283 U1 | 6/2000 |
| EP | 1 265 343 A2 | 12/2002 |
| WO | WO 02/052688 A1 | 7/2002 |

OTHER PUBLICATIONS

Apr. 7, 2009 Advisory Action (U.S. Appl. No. 11/332,462).
Nov. 25, 2008 Final Rejection (U.S. Appl. No. 11/332,462).
Mar. 31, 2008 Non-Final Rejection (U.S. Appl. No. 11/332,462).
Nuhrmann, Dieter; Das große Werkbuch Elektronik/Dieter Nuhrmann—(Ausg. In 4 Bd.); Poing, Franzis 1998 ISBN 3-7723-6547-7 pp. 2606-2608.
Power Factor Correction, Electrical Engineering Training Series, Integrated Publishing, http://www.tpub.com/neets/book2/4k.htm.
Oct. 16, 2009 Final Rejection (U.S. Appl. No. 11/296,703).
Feb. 19, 2009 Non-Final Rejection (U.S. Appl. No. 11/296,703).
Jun. 3, 2008 Final Rejection (U.S. Appl. No. 11/296,703).
Jun. 3, 2008 Examiner Interview Summary Record (U.S. Appl. No. 11/296,703).
Nov. 5, 2007 Non-Final Rejection (U.S. Appl. No. 11/296,703).
Dixon Jr., Lloyd H., High Power Factor Preregulators for Off-Line Power Supplies, 2003, pp. 6-1-6-16, Unitrode Corporation.
Simonetti et al., The Discontinuous Conduction Mode Sepic and Ćuk Power Factor Preregulators: Analysis and Design, IEEE Transactions on Industrial Electronics, Oct. 1997, vol. 44, No. 5.
Tietze et al., Halbleiter-Schaltungstechnik, 2002, pp. 942-948, 12th edition, Springer.
Unitrode: Product data handbook, Apr. 1997, pp. 3-388-3-397, Merrimack, NH.
U.S. Appl. No. 11/296,703 - Office Action dated May 3, 2010.
Translation of Opposition against DE 10 2005 002 359 B4.

* cited by examiner

CURRENT-LIMITING CIRCUIT AND METHOD FOR OPERATING THE CIRCUIT

CROSS REFERENCE TO RELATED APPLICATIONS

This application is a continuation-in-part of application Ser. No. 11/332,462, filed Jan. 17, 2006, which claims priority to German Application No. 10 2005 002 359.2, filed Jan. 18, 2005; and which is related to the application of Bernhard Erdl and Hubert Schonberger, entitled "Circuit Arrangement for Overvoltage Detection and Method for Operating Circuit Arrangement," filed Dec. 8, 2005, and assigned Ser. No. 11/296,703; and to the application of Bernhard Erdl and Heiner Friedrich, entitled "Power Supply," filed Dec. 13, 2005, and assigned Ser. No. 11/301,256, now U.S. Pat. No. 7,359,219. Each patent application identified above is incorporated here by reference in its entirety to provide continuity of disclosure.

BACKGROUND OF THE INVENTION

Field of the Invention

The invention relates to a current-limiting circuit and a method for operating the circuit.

An essential challenge in power circuits is to limit a switch-on current for an electrical power-consuming component, e.g. an electrical device. Immediately after the electrical power-consuming component is switched on, for example, capacitors are charged, which temporarily results in a high electrical load on the supply, the power-consuming component, and the (external) switch in particular. On the one hand, the powerful load on the supply is undesirable and on the other hand, it is disadvantageous that the affected parts of the power-consuming component must be designed to withstand this high current, which is many times greater than the current during normal operation. It is therefore known, as described for example in German publication DE 2000 10283U1 to provide a limitation of the switch-on current in order to reduce the supply system load during the switching-on of the power-consuming component. To that end, a field effect transistor is suitably triggered so that the field effect transistor is at most encumbered with a predeterminable maximum power loss.

It is disadvantageous in such arrangements that the field effect transistor operates in a linear mode and therefore generates significant losses.

Also, according to the standard EN610003-3, the switch-on current must not exceed predetermined values.

SUMMARY OF THE INVENTION

The object of the invention is to disclose a circuit for effectively limiting current without high losses and a method for operating this circuit.

This object is attained according to the defining characteristics of the independent claims. Modifications of the invention are disclosed in the dependent claims.

In order to attain the object of the invention, a current-limiting circuit is disclosed, which includes a switch, a diode, an inductance, an input with a first connection and second connection, and an output with a first connection and second connection. In an exemplary embodiment of the current-limiting circuit, the first connection of the input is connected via the switch to the inductance and to the cathode of the diode and is connected via the inductance to the first connection of the output. In addition, the anode of the diode is connected to the second connection of the input and to the second connection of the output.

The above-described wiring of the component in question is particularly suitable for use as a clocked current limitation device. It is thus possible, with a high frequency triggering of the switch, to use a correspondingly low inductance. It is also advantageous when a predetermined current threshold is exceeded to open the switch and thus disconnect the output from the input. This can advantageously occur both during the switch-on phase and also during operation of the circuit, e.g. when a power-consuming component is connected to the output.

It should be noted here that the present current-limiting circuit can be used preferably as a component of a circuit, in particular of an electrical power-consuming component. Preferably, the circuit here is used in a power supply, in particular in a power pack or a (clocked) switched mode power supply. Another possible use for the circuit is to permit this power supply, in particular the switched mode power supply, to be mounted on a mounting rail and/or mounted in a switching cabinet.

Preferably, the circuit can be a circuit for clocked current limitation.

In one embodiment, the switch is comprised of at least one electronic switch, in particular a transistor, a MOSFET, a thyristor, or an IGBT. It is also possible for the electronic switch to be a combination of several switches, in particular electronic switches.

In another embodiment, a resistor is connected between the switch and the cathode of the diode and/or the inductance. This resistor is particularly suitable for use as a measurement resistor for measuring current and consequently for triggering the (electronic) switch.

In one particular embodiment, the inductance is an inductance of a filter, in particular a component of a high frequency filter (HF filter). This is advantageous since the HF filter already has an inductance that the circuit can also use for current limitation, thus eliminating the need for providing an additional inductance.

In particular the current-limiting circuit can be placed between two capacitors of an HF filter.

In one modification, the input of the current-limiting circuit is preceded by a rectifier circuit.

In another modification, a capacitor is provided at the output of the current-limiting circuit. In particular, this capacitor can be an electrolytic capacitor ("buffer capacitor"). In another embodiment, the switch charges this capacitor in a clocked fashion, the clock speed serving to limit the current flowing through the circuit.

In one embodiment, a power factor correction circuit is connected to the output of the current-limiting circuit.

The power factor correction circuit can preferably be embodied in the form of a boost converter equipped with a suitable triggering mechanism. In particular, the power factor correction includes at least one electronic circuit, e.g. a transistor, a MOSFET, a thyristor, or an IGBT.

The object of the invention is also attained by means of a current-limiting method, in particular by means of triggering the above-describe circuit, in which the switch is preferably opened when a predetermined current threshold is exceeded.

Preferably, the instantaneous current is measured by a resistor.

In one embodiment, at least some of the time, the switch is closed and opened at a predetermined clock speed.

In one modification, the switch is triggered by at least one pulse generator and/or at least one Schmitt trigger or at least one comparator. Preferably, the clock speed can have an (optionally variable) frequency of approx. 1 KHz to approx. 1 MHz.

In another modification, the cyclical closing and opening of the switch serves to charge at least one capacitor (buffer capacitor).

In another modification, the circuit is used to limit switch-on current and/or to detect transients.

It should be noted here that the term overvoltage is intended herein to apply to all forms of voltages greater than a predetermined supply voltage, in particular a line voltage, and all forms of surges and voltage spikes. In particular, the term "transient" is intended to apply to all types of chronologically limited overvoltages that deviate from the target values of the electrical supply voltage. It should additionally be noted that an overvoltage can also stem from a current spike.

Particularly when circuits, devices, or power-consuming components are supplied by electrical networks, it is necessary to protect them from overvoltages, in particular overvoltage pulses. Such a pulse is defined, for example in the standard EN61000-4-5, as having a rise time of 1.2 μs and a half value time of 50 μs and can occur, for example, when lightning strikes. The standard VDE 0160W2 describes another known pulse with a peak voltage of 747 volts (rise time 100 μs, half value time 1.3 μs), which, as a pure voltage pulse, supplies a (theoretically infinitely) high current.

BRIEF DESCRIPTION OF THE DRAWINGS

Exemplary embodiments of the invention will be explained below in conjunction with the drawings.

DESCRIPTION OF THE PREFERRED EMBODIMENTS

Figure 1:
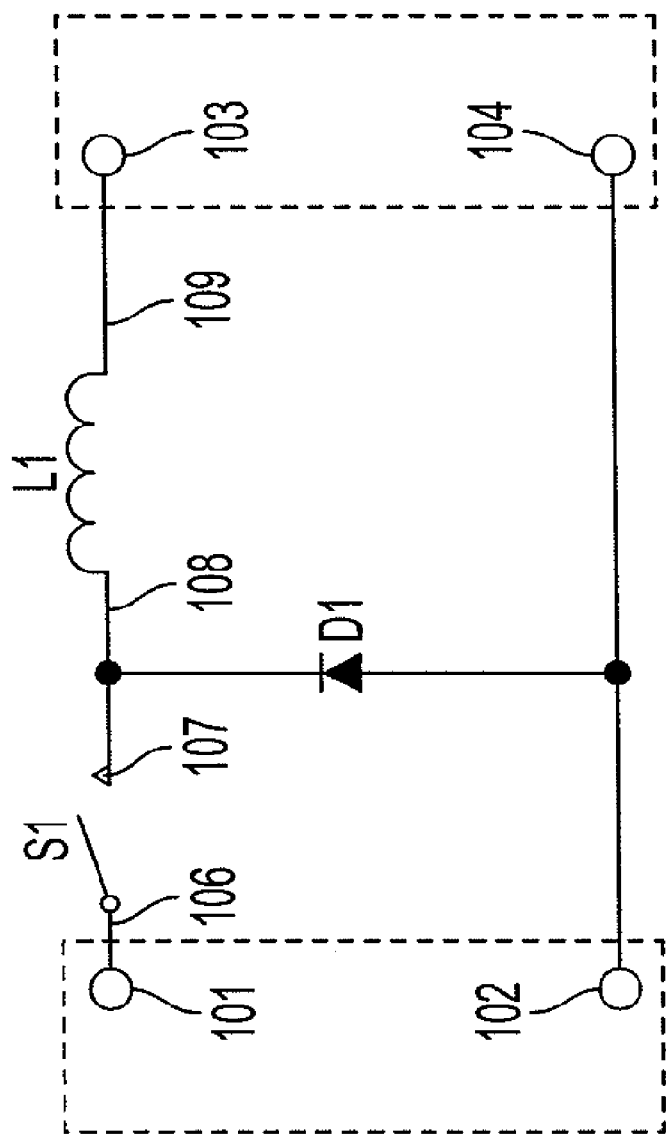
FIG. 1 is a circuit diagram of an exemplary embodiment of a current-limiting circuit.

FIG. 1 shows a circuit diagram of an embodiment of a current-limiting circuit, including an input with connections 101 and 102, an output with connections 103 and 104, a switch S1 with connections 106 and 107, an inductance L1 with connections 108 and 109, and a diode D1.

The connection 101 of the input is connected to the connection 106 of the switch S1, while the connection 107 of the switch S1 is connected to the connection 108 of the inductance L1 and to the cathode of the diode D1. The connection 109 of the inductance L1 is connected to connection 103 of the output. In addition, the anode of the diode D1 is connected to the connection 102 of the input and to the connection 104 of the output.

The circuit diagram in FIG. 1 illustrates the principal arrangement of components for (clocked) current limitation. The switch S1 can in particular be embodied in the form of an electronic switch that opens if the current exceeds a predetermined threshold. To that end, switch S1 is preferably an electronic switch provided with a suitable triggering mechanism. The switch S1 is closed and reopened at a predetermined frequency, which assures operation of the circuit, in particular a power-consuming component connected to the output via the connections 103 and 104, even at a current above the threshold. This frequency effectively limits the flow of current through the circuit, in particular the current provided to the power-consuming component via the connections 103 and 104. Such a limiting suitably occurs during the switching-on process of the circuit and/or of the power-consuming component (e.g. for charging possibly drained capacitors) and/or during operation of the circuit, in the event of the (sudden) occurrence of powerful currents (e.g. due to overvoltage pulses or transients).

Figure 2:
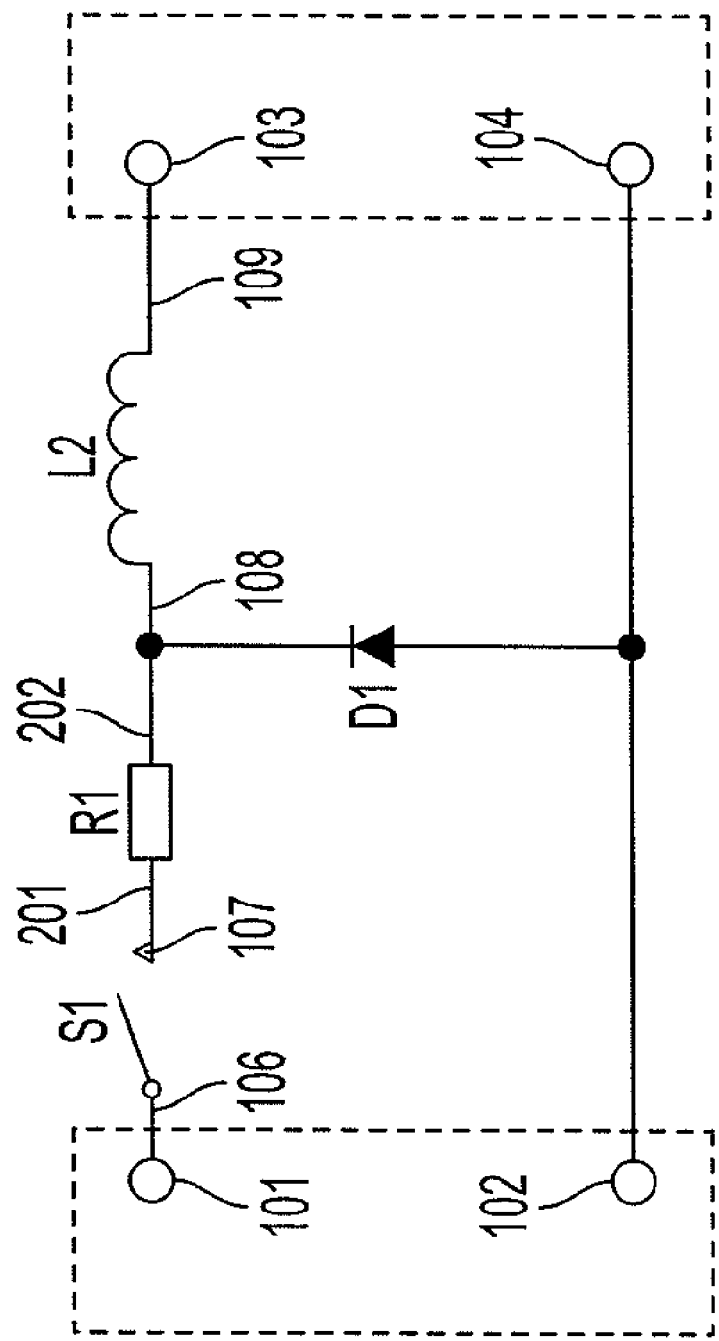
FIG. 2 is a circuit diagram of an alternate embodiment of a current-limiting circuit.

FIG. 2 shows a circuit diagram of a modified current-limiting circuit. By contrast with FIG. 1, this circuit is additionally provided with a resistor R1 equipped with the connections 201 and 202. The connection 201 of the resistor R1 is connected to the connection 107 of the switch S1, while the connection 202 of the resistor R1 is connected to the connection 108 of the inductance L1 and to the cathode of the diode D1. Consequently, the connection 107 of the switch S1 is no longer connected to the inductance L1 and the diode D1 as shown in FIG. 1; instead, the resistor R1 is situated in series with switch S1 between the connection 107 of the switch S1 from FIG. 1 and the node point between the inductance L1 and the diode D1.

The resistor R1 is preferably embodied in the form of a measurement resistor for detecting the current flowing through it. A current detected in this fashion can be used to trigger the (in particular electronic) switch S1.

Figure 3:
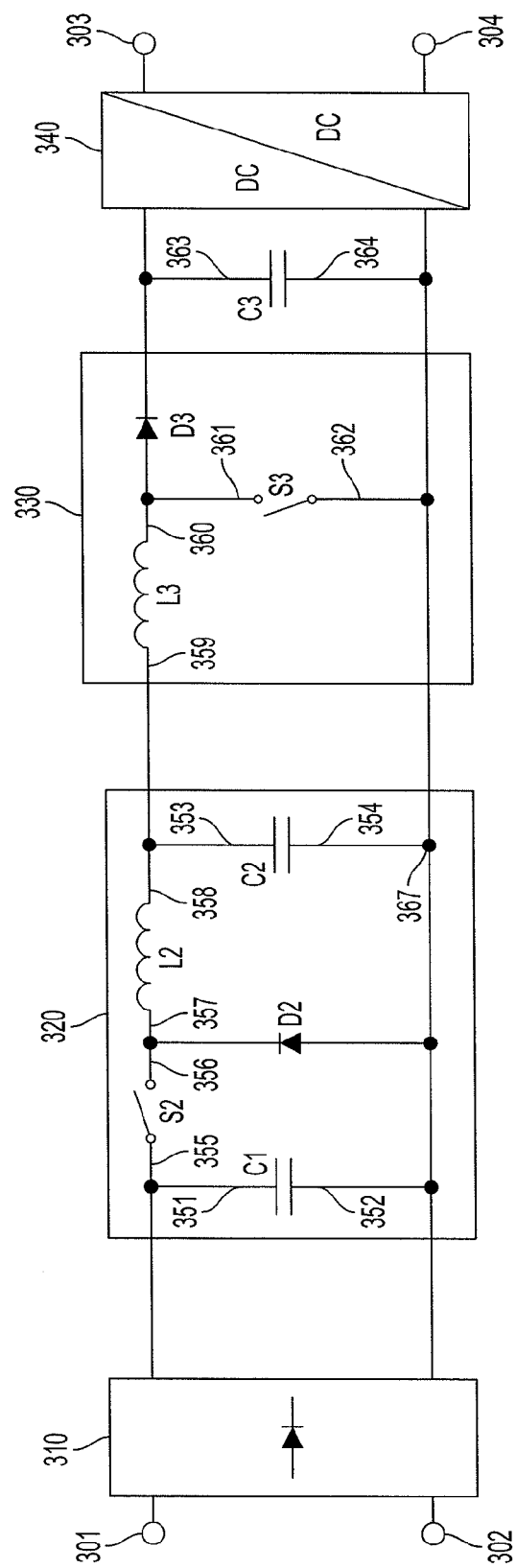
FIG. 3 is a circuit diagram of a power supply equipped with an exemplary embodiment of a current-limiting circuit.

FIG. 3 shows a circuit diagram of a power supply equipped with a current-limiting circuit. The circuit diagram from FIG. 3 shows an input with the connections 301 and 302 and an output with the connections 303 and 304. The circuit is also provided with a rectifier 310, a filter unit 320 (embodied in the form of a high-frequency filter (HF filter) equipped with a current-limiting circuit), a power factor correction (PFC unit) 330 (for example embodied in the form of a boost converter), a capacitor C3 ("buffer capacitor"), in particular embodied in the form of an electrolytic capacitor, and a transformer or DC/DC converter 340.

The rectifier 310 is connected to the connections 301 and 302 of the input. The rectifier 310 converts the preferably supplied alternating current signal into a direct current signal and transmits it to the HF filter 320 equipped with the current-limiting circuit.

The filter unit 320 includes a capacitor C1 (with connections 351 and 352), a capacitor C2 (with connections 353 and 354), a diode D2, a switch S2 (with connections 355 and 356), and an inductance L2 (with connections 357 and 358).

The capacitor C1 is connected in parallel with the input of the unit 320, while the connection 351 of the capacitor C1 is connected to the connection 355 of the switch S2. The connection 356 of the switch S2 is connected to the cathode of the diode D2 and to the connection 357 of the inductance L2. The capacitor C2 is connected in parallel to the output of the unit 320, while the connection 353 of the capacitor C2 is connected to the connection 358 of the inductance L2. The connection 354 of the capacitor C2 is connected to the connection 352 of the capacitor C1 and the anode of the diode D2. This shared connection point is also referred to as node 367.

If the filter unit 320 is considered to be a quadripole, i.e. a unit with an input and output—each of which has two connections, then the input on the one hand includes an attachment of the connection 351 of the capacitor C1 to the connection 355 of the switch S2 and on the other hand, includes an attachment of the connection 352 of the capacitor C1 to the anode of the diode D2 and to the connection 354 of the capacitor C2 (this corresponds to the node 367). The output on the one hand includes an attachment of the connection 358 of the inductance L2 to the connection 353 of the capacitor C2 and on the other hand, includes an attachment to the node 367.

The power factor correction unit 330 includes an inductance L3 (with connections 359 and 360), a switch S3 (with connections 361 and 362), and a diode D3.

The connection 359 of the inductance L3 is connected to the connection 353 of the capacitor C2 and to the connection 358 of the inductance L2. The connection 360 of the inductance L3 is connected to the connection 361 of the switch S3 and to the anode of the diode D3. The connection 362 of the switch S3 is connected to the connection 354 of the capacitor C2 (and to the anode of the diode D2, to the connection 352 of the capacitor C1, and to the output of the rectifier 310, and thus to the node 367).

The switch S3 is preferably embodied in the form of an electronic switch, in particular a transistor, a MOSFET, a thyristor, or an IGBT. A suitable triggering mechanism assures that the PFC or boost converter 330 counteracts the capacitive and/or inductive resistances of the circuit (see, e.g., "Power Factor Correction" at http://www.tpub.com/neets/book2/4k.htm).

The "buffer capacitor" C3, in particular embodied, for example, in the form of an electrolytic capacitor, includes the connections 363 and 364; the connection 363 of the capacitor C3 is connected to the cathode of the diode D3 and to the input of the transformer 340. The connection 364 of the capacitor C3 is connected to the node 367 and to the other input of the transformer 340. Consequently, the connections 363 and 364 of the capacitor C3 are connected in parallel to the input of the transformer 340. At the output of the transformer 340, the connections 303 and 304 are supplied (in a controllable fashion) with the converted direct current, in particular in a range from for example 3 volts to 48 volts.

The transformer 340 can in particular be embodied in the form of a direct current converter, e.g. a flyback converter, a flow converter, or a push-pull converter.

The unit 320 includes the switch S2, the inductance L2, and the current-limiting diode D2, these components comprising parts of the HF filter. In particular, the inductance L2 is both a component of the HF filter (in connection with the capacitors C1 and C2) and a component of the current-limiting circuit.

With a suitable clock cycle of the switch S2, during the switching-on process, the capacitor C3 can be charged in a controlled fashion, i.e. so that the current does not exceed a predetermined threshold.

Alternatively, the secondary side of the DC/DC converter 340 can be provided with the current-limiting circuit, e.g. as in FIG. 1, in order to prevent short circuits in the power supply.

Figure 4:
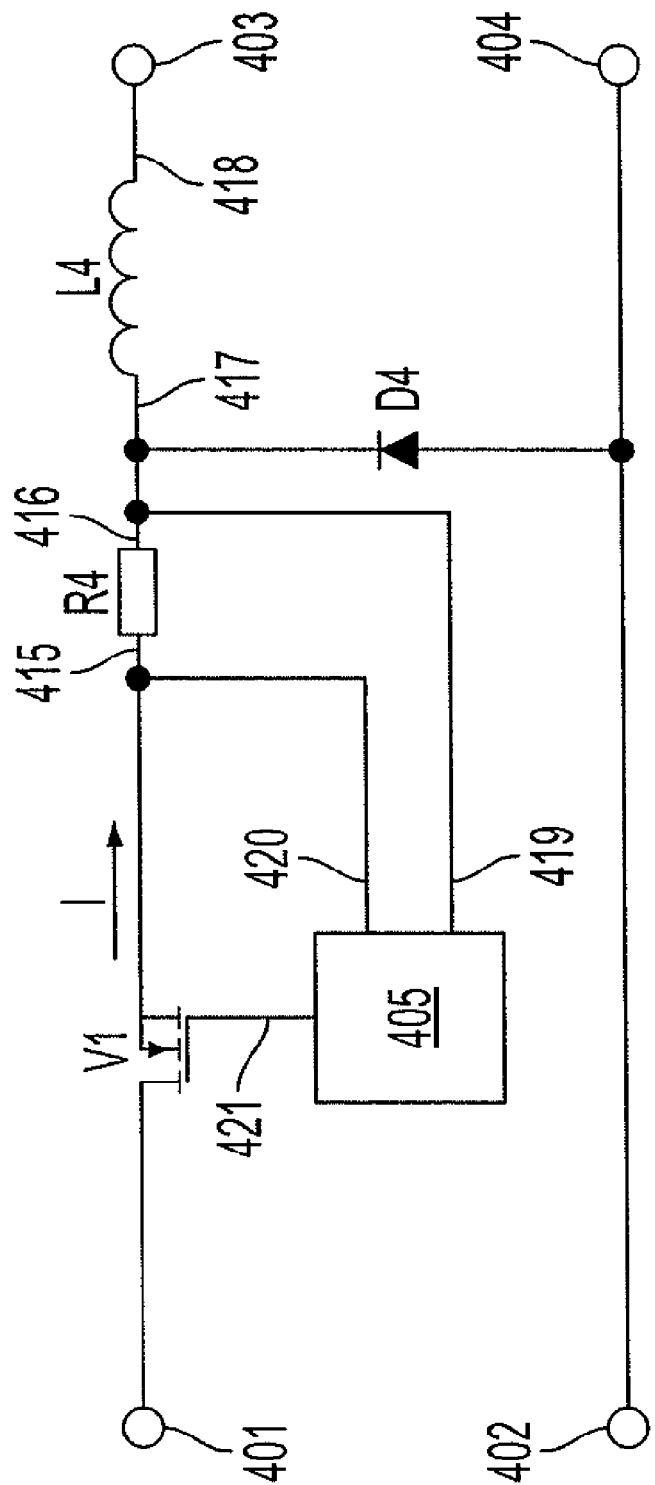
FIG. 4 is a circuit diagram of an exemplary embodiment of a current-limiting circuit equipped with an electronic switch.

FIG. 4 shows a circuit diagram of a current-limiting circuit equipped with an electronic switch.

FIG. 4 includes an input with connections 401 and 402, an output with connections 403 and 404, a resistor R4 (with connections 415 and 416), an n-channel MOSFET V1, a diode D4, an inductance L4 (with connections 417 and 418), and a triggering unit 405 (with inputs 419, 420 and an output 421).

The connection 401 of the input is connected to the drain connection of the MOSFET V1. The source connection of the MOSFET V1 is connected to the connection 415 of the resistor R4 and the input 420 of the triggering unit 405. The connection 416 of the resistor R4 is connected to the input 419 of the triggering unit 405, to the connection 417 of the inductance L4, and to the cathode of the diode D4. The connection 418 of the inductance L4 is connected to the connection 403 of the output. The anode of the diode D4 is connected to the connection 402 of the input and to the connection 404 of the output. The output 421 of the triggering unit 405 is connected to the gate connection of the MOSFET V1.

Operation of the Circuit According to FIG. 4:

The MOSFET V1 is the electronic switch for the current limitation. If the current I passing through the measurement resistor R4 exceeds a predetermined threshold, then the triggering unit 405 disconnects the MOSFET V1. The current passing through the resistor R4 is detected and evaluated by the inputs 419 and 420 of the triggering unit 405. In accordance with the evaluated signal, the triggering unit 405 switches the MOSFET V1 into the conductive and/or non-conductive state.

But to prevent this from resulting in a permanently non-conductive state, the triggering unit triggers the MOSFET V1 so that it closes and opens with a frequency; which may be variable. The frequency with which the MOSFET V1 is triggered determines the current I. Through a suitable selection of the frequency, it is thus possible to regulate and, in particular, limit the current I. If the current I is greater than a predetermined threshold, then the triggering unit 405 performs a regulating function; for example at least one comparator in the control unit 405 is used to influence the frequency for the triggering of the MOSFET V1. Alternatively, at least one Schmitt trigger in the triggering unit 405 can be used, for example, to generate a hysteresis for a control procedure.

It is thus possible with the circuit according to FIG. 4 not only to detect and limit overvoltages and current surges, but also to limit the current during the switching-on process, e.g. when the connections 403 and 404 of the output contain a number of drained that require charging at the beginning.

Figure 5:
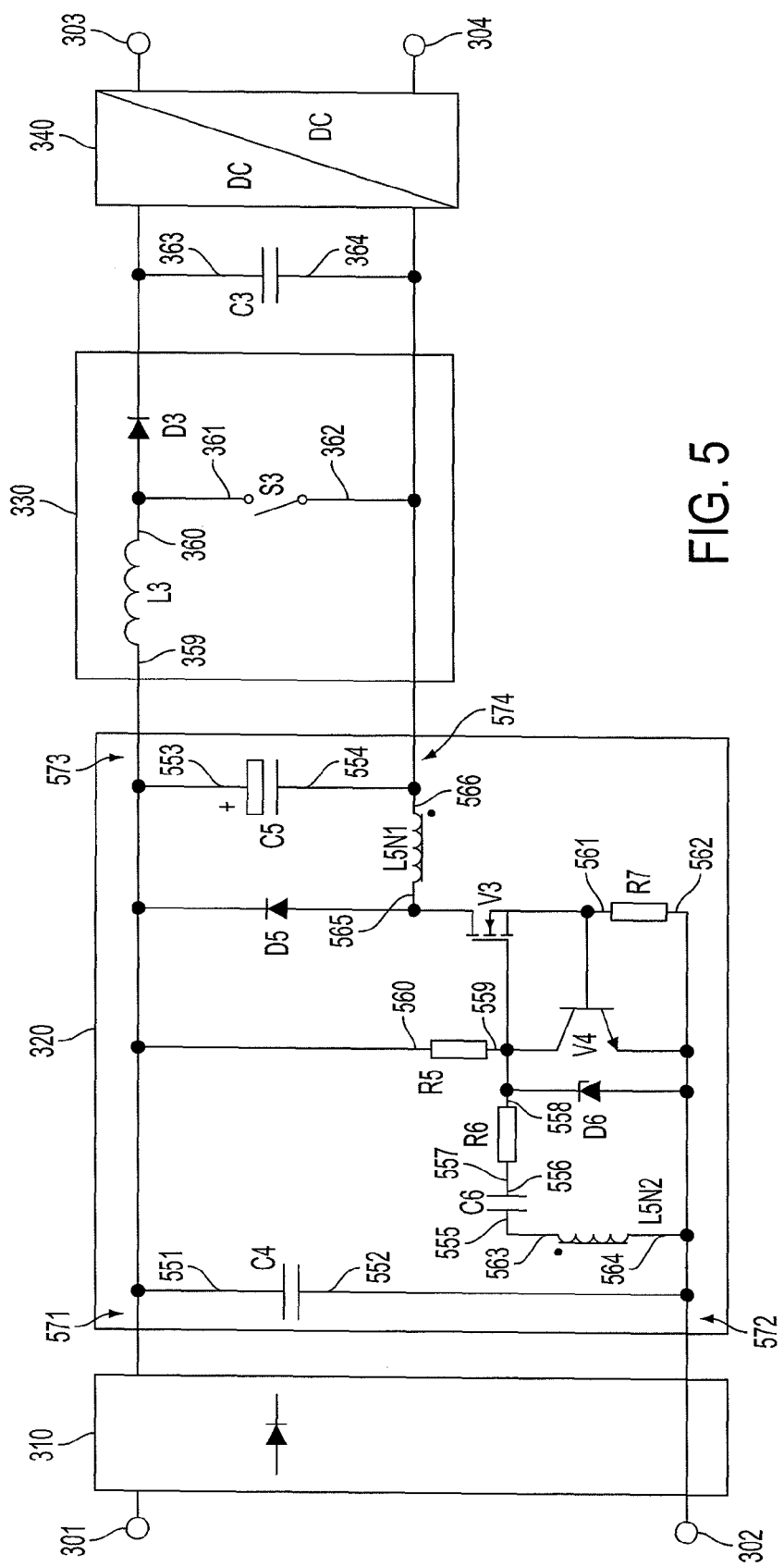
FIG. 5 is a detailed circuit diagram of an exemplary embodiment of a current-limiting circuit equipped with an electronic switch.

FIG. 5 shows a detailed circuit diagram of a current-limiting circuit equipped with an electronic switch. In some regions, FIG. 5 corresponds to the above-described FIG. 3; in particular, the rectifier 310, the power factor correction 330, the buffer capacitor C3, and the transformer or converter 340 correspond to those described in conjunction with FIG. 3. The connections 301 and 302 of the input and the connections 303 and 304 of the output have also been described in conjunction with FIG. 3. The difference in relation to FIG. 3 lies in the detailed wiring of the unit 320, which has an HF filter and a current-limiting circuit, in particular for limiting the switching-on current and for disconnecting transients.

To that end, the filter unit 320 includes a capacitor C4 (with connections 551 and 552), an electrolytic capacitor C5 (with connections 553 (positive pole) and 554), a capacitor C6 (with connections 555 and 556), a resistor R5 (with connections 559 and 560), a resistor R6 (with connections 557 and 558), a resistor R7 (with connections 561 and 562), a primary winding N1 of an inductance L5 (with connections 565 and 566), and a secondary winding N2 of the inductance L5 (with connections 563 and 564). A diode D5, a Zener diode D6, an n-channel MOSFET V3, and an npn-transistor V4 are also provided.

For the sake of a more comprehensive overview, the filter unit 320 also has an input with connections 571 and 572 and an output with connections 573 and 574.

The connection 551 of the capacitor C4 is connected to the connection 571 of the input, to the connection 560 of the resistor R5, to the cathode of the diode D5, to the connection 553 of the capacitor C5, and to the connection 573 of the output. The connection 552 of the capacitor C4 is connected to the connection 572 of the input, to the connection 564 of the secondary winding N2 of the inductance L5, to the anode of the Zener diode D6, to the emitter of the transistor V4, and to the connection 562 of the resistor R7. The connection 554 of the capacitor C5 is connected to the connection 566 of the primary winding N1 of the inductance L5 and to the connection 574 of the output. The connection 565 of the primary winding N1 of the inductance L5 is connected to the drain connection of the MOSFET V3 and to the anode of the diode D5. The connection 563 of the secondary winding N2 of the inductance L5 is connected to connection 555 of the capacitor C6. The connection 556 of the capacitor C6 is connected to the connection 557 of the resistor R6. The connection 558 of the resistor R6 is connected to the cathode of the Zener diode D6, to the connection 559 of the resistor R5, to the collector of the transistor V4, and to the gate connection of the MOSFET V3. The source connection of the MOSFET V3 is connected to the base of the transistor V4 and to the connection 561 of the resistor R7.

The input of the unit 320 is connected to the rectifier 310 according to the description associated with FIG. 3 and the output of the unit 320 is connected to the power factor correction 330 according to (the description of) FIG. 3.

Operation of the Circuit According to FIG. 5:

The circuit from FIG. 5 uses the MOSFET V3 to disconnect the output of the unit 320 from its input if a current greater than a predetermined threshold would otherwise flow.

Switching-On of the MOSFET V3:

The capacitor C6 is charged by the operating voltage via the resistors R5 and R6 as long the threshold voltage reaches the gate connection of the MOSFET V3, whereupon the MOSFET V3 is switched into a linearly conductive state. In the primary winding of the inductance L5N1, a voltage is generated, which, depending on the turns ratio, is also present in the secondary winding L5N2 and thus also activates or turns ON the gate connection of the MOSFET V3. This results in a positive feedback effect, i.e. as soon as the gate connection of the MOSFET V3 has exceeded its threshold voltage and the MOSFET V3 switches into the conductive state, the positive feedback via the secondary winding L5N2 reinforces the switching into the conductive state.

Switching-Off of the MOSFET V3:

If the MOSFET V3 is switched into the conductive state, then a current flows through the measurement resistor R7. As soon as the base of the transistor V4 reaches the threshold voltage in relation to the emitter, the transistor V4 begins to switch into a conductive state. The MOSFET V3 switches into the nonconductive state, whereupon the voltage in the primary winding L5N1 (and therefore also in the secondary winding L5N2) reverses polarity. This in turn results in a positive feedback of the transistor V4 until the capacitor C6 is discharged and the base of the transistor V4 is no longer positive in relation to the emitter. Alternatively, in lieu of the transistor V4, it is also possible to provide a thyristor, which is triggered with a predetermined gate triggering voltage and then switches the MOSFET V3 into the nonconductive state. The thyristor can be switched off again as a function of the voltage in the primary winding L5N1.

Figure 6:
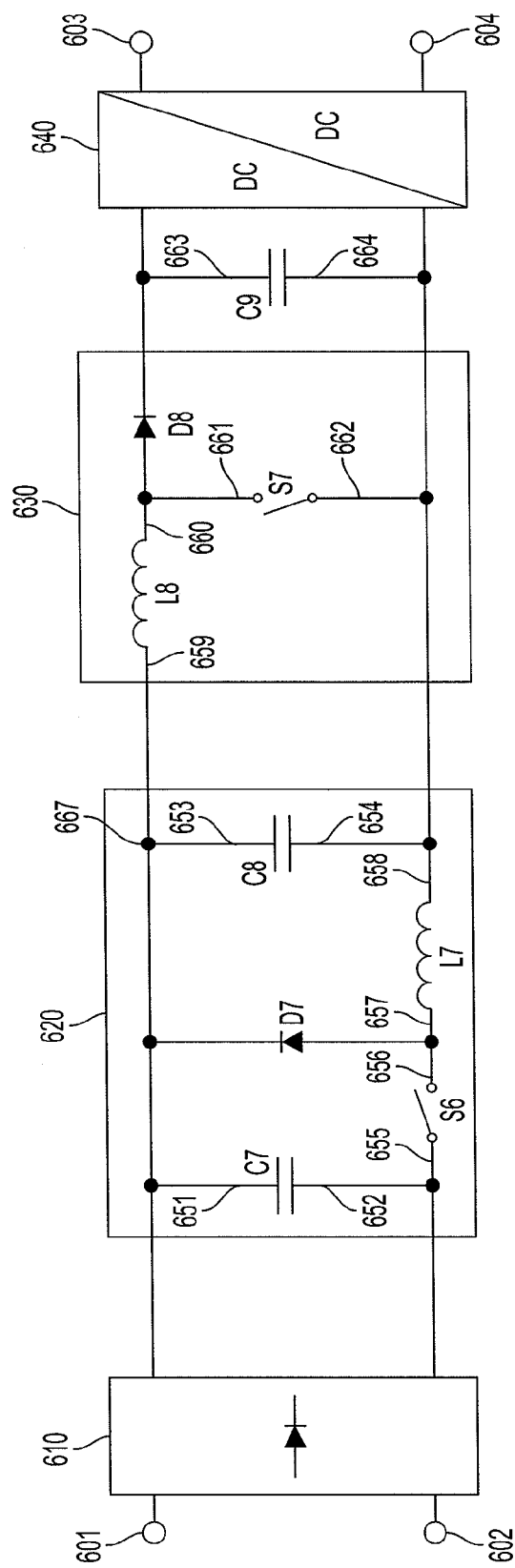
FIG. 6 is a circuit diagram of a power supply equipped with an alternate embodiment of a current-limiting circuit.

FIG. 6 shows an alternate embodiment of a circuit diagram of a power supply equipped with a current-limiting circuit. Some regions of FIG. 6 may correspond to the above-described FIG. 3. In particular, the rectifier 610, the power factor correction 630, the buffer capacitor C9, and the transformer or converter 640 may correspond to their counterpart elements described in conjunction with FIG. 3; the connections 601 and 602 of the input and the connections 603 and 604 of the output may also correspond to the input and output connections described in conjunction with FIG. 3. In such case, the difference in relation to FIG. 3 lies in the detailed wiring of the unit 620, which has an HF filter and a current-limiting circuit, in particular for limiting the switching-on current and for disconnecting transients.

The circuit diagram in FIG. 6 shows an input with the connections 601 and 602 and an output with the connections 603 and 604. The circuit is also provided with a rectifier 610, a filter unit 620 (embodied in the form of an HF filter equipped with a current-limiting circuit), a PFC unit 630 (for example embodied in the form of a boost converter), a capacitor C9 ("buffer capacitor"), embodied, for example, in the form of an electrolytic capacitor, and a transformer or DC/DC converter 640.

The rectifier 610 is connected to the connections 601 and 602 of the input. The rectifier 610 converts the preferably supplied alternating current signal into a direct current signal and transmits it to the HF filter 620 equipped with the current-limiting circuit.

The filter unit 620 includes a capacitor C7 (with connections 651 and 652), a capacitor C8 (with connections 653 and 654), a diode D7, a switch S6 (with connections 655 and 656), and an inductance L7 (with connections 657 and 658).

The capacitor C7 is connected in parallel with the input of the filter unit 620, while the connection 652 of the capacitor C7 is connected to the connection 655 of the switch S6. The connection 656 of the switch S6 is connected to the anode of the diode D7 and to the connection 657 of the inductance L7. The capacitor C8 is connected in parallel to the output of the filter unit 620, while the connection 654 of the capacitor C8 is connected to the connection 658 of the inductance L7. The connection 653 of the capacitor C8 is connected to the connection 651 of the capacitor C7 and to the cathode of the diode D7. This shared connection point is also referred to as node 667.

The filter unit 620 may be considered to be a quadripole, i.e. a unit with an input and output—each of which having two connections, in which case the input on the one hand includes an attachment of the connection 652 of the capacitor C7 to the connection 655 of the switch S2 and on the other hand, includes an attachment of the connection 651 of the capacitor C7 to the cathode of the diode D7 and to the connection 653 of the capacitor C8 (this corresponds to the node 667). The output on the one hand includes an attachment of the connection 658 of the inductance L7 to the connection 654 of the capacitor C8 and on the other hand, includes an attachment to the node 667.

The power factor correction unit 630 includes an inductance L8 (with connections 659 and 660), a switch S7 (with connections 661 and 662), and a diode D8.

The connection 659 of the inductance L8 is connected to the connection 653 of the capacitor C8 (and to the cathode of the diode D7, to the connection 651 of the capacitor C7, and to the output of the rectifier 610, and thus to the node 667). The connection 660 of the inductance L8 is connected to the connection 661 of the switch S7 and to the anode of the diode D8. The connection 662 of the switch S7 is connected to the connection 654 of the capacitor C8.

The switch S7 is preferably embodied in the form of an electronic switch, in particular a transistor, a MOSFET, a thyristor, or an IGBT. A suitable triggering mechanism assures that the PFC or boost converter 630 counteracts the capacitive and/or inductive resistances of the circuit (see, e.g., "Power Factor Correction" at http://www.tpub.com/neets/book2/4k.htm).

The "buffer capacitor" C9 is embodied, for example, in the form of an electrolytic capacitor, and includes the connections 663 and 664; the connection 663 of the capacitor C9 is connected to the cathode of the diode D8 and to a first connection of an input of the transformer 640. The connection 664 of the capacitor C9 is connected to the connection 654 of the capacitor C8, to the connection 658 of the inductance L7, and to a second connection of the input of the transformer 640. Consequently, the connections 663 and 664 of the capacitor C9 are connected in parallel to the input of the transformer 640. At the output of the transformer 640, the connections 603 and 604 are supplied (in a controllable fashion) with the converted direct current, in particular in a range from, for example, 3 volts to 48 volts.

The transformer 640 can in particular be embodied in the form of a direct current converter, e.g. a flyback converter, a flow converter, or a push-pull converter.

The unit 620 includes the switch S6, the inductance L7, and the current-limiting diode D7, these components comprising parts of the HF filter. In particular, the inductance L7 is both a component of the HF filter (in connection with the capacitors C7 and C8) and a component of the current-limiting circuit.

With a suitable clock cycle of the switch S6, during the switching-on process, the capacitor C9 can be charged in a controlled fashion, i.e. so that the current does not exceed a predetermined threshold.

Alternatively, the secondary side of the DC/DC converter 640 can be provided with the current-limiting circuit, e.g. as in FIG. 1, in order to prevent short circuits in the power supply.

Figure 7:
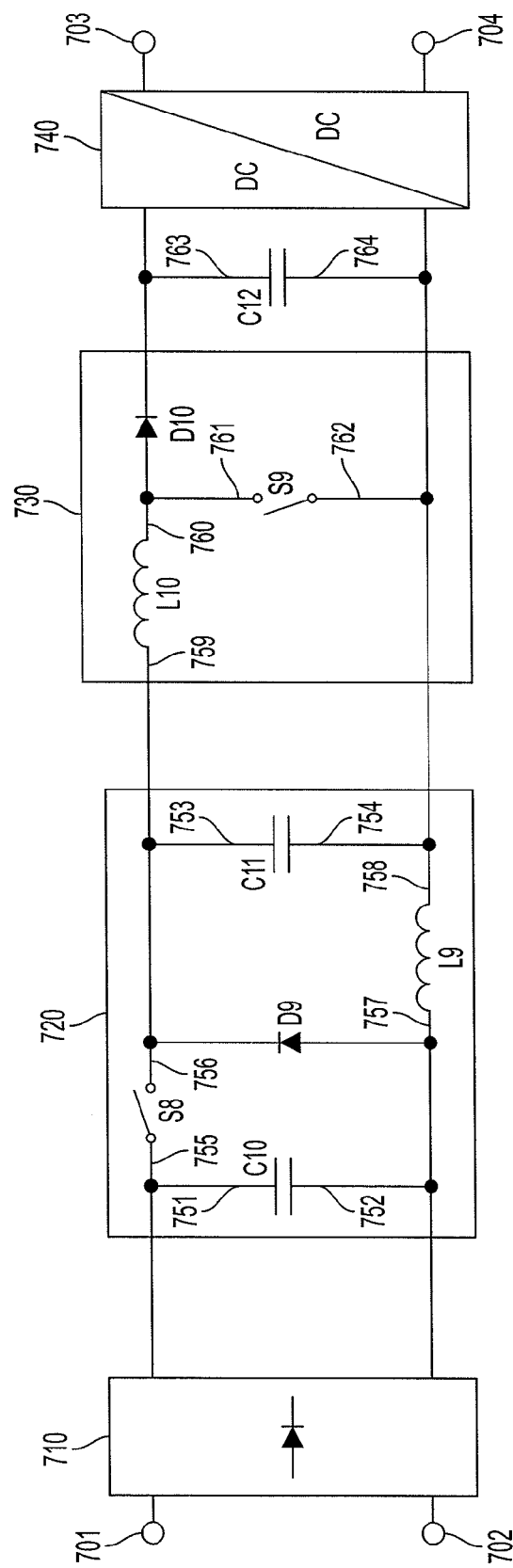
FIG. 7 is a circuit diagram of a power supply equipped with an alternate embodiment of a current-limiting circuit.

FIG. 7 shows an alternate embodiment of a circuit diagram of a power supply equipped with a current-limiting circuit. Some regions of FIG. 7 may correspond to the above-described FIG. 3. In particular, the rectifier 710, the power factor correction 730, the buffer capacitor C12, and the transformer or converter 740 may correspond to their counterpart elements described in conjunction with FIG. 3; the connections 701 and 702 of the input and the connections 703 and 704 of the output may also correspond to the input and output connections described in conjunction with FIG. 3. In such case, the difference in relation to FIG. 3 lies in the detailed wiring of the unit 720, which has an HF filter and a current-limiting circuit, in particular for limiting the switching-on current and for disconnecting transients.

The circuit diagram in FIG. 7 shows an input with the connections 701 and 702 and an output with the connections 703 and 704. The circuit is also provided with a rectifier 710, a filter unit 720 (embodied in the form of an HF filter equipped with a current-limiting circuit), a PFC unit 730 (for example embodied in the form of a boost converter), a capacitor C12 ("buffer capacitor"), embodied, for example, in the form of an electrolytic capacitor, and a transformer or DC/DC converter 740.

The rectifier 710 is connected to the connections 701 and 702 of the input. The rectifier 710 converts the preferably supplied alternating current signal into a direct current signal and transmits it to the HF filter 720 equipped with the current-limiting circuit.

The filter unit 720 includes a capacitor C10 (with connections 751 and 752), a capacitor C11 (with connections 753 and 754), a diode D9, a switch S8 (with connections 755 and 756), and an inductance L9 (with connections 757 and 758).

The capacitor C10 is connected in parallel with the input of the filter unit 720, while the connection 751 of the capacitor C10 is connected to the connection 755 of the switch S8. The connection 756 of the switch S8 is connected to the cathode of the diode D9. The capacitor C11 is connected in parallel to the output of the filter unit 720, while the connection 754 of the capacitor C11 is connected to the connection 758 of the inductance L9. The connection 757 of the inductance L9 is connected to the anode of the diode D9 and is further connected to the connection 752 of the capacitor C10. The connection 751 of the capacitor C10 is connected through the switch S8 to the cathode of the diode D9 and is further connected to the connection 753 of the capacitor C11. This shared connection point is also referred to as node 767 (not shown).

The filter unit 720 may be considered to be a quadripole, i.e. a unit with an input and output—each of which having two connections, in which case the input on the one hand includes an attachment of the connection 751 of the capacitor C10 to the connection 755 of the switch S8 and an attachment of the capacitor C10—through the switch S8—to the cathode of the diode D9 and to the connection 753 of the capacitor C11 (this corresponds to the node 767); the input on the other hand, includes an attachment of the connection 752 of the capacitor C10 to the anode of the diode D9 and an attachment—through the inductance L9—to the connection 754 of the capacitor C11. The output on the one hand includes an attachment of the connection 758 of the inductance L9 to the connection 754 of the capacitor C11 and on the other hand, includes an attachment to the node 767 (not shown).

The power factor correction unit 730 includes an inductance L10 (with connections 759 and 760), a switch S9 (with connections 761 and 762), and a diode D10.

The connection 759 of the inductance L10 is connected to the connection 753 of the capacitor C11 (and to the cathode of the diode D9, to the connection 751 of the capacitor C10, and to the output of the rectifier 710, and thus to the node 767). The connection 760 of the inductance L10 is connected to the connection 761 of the switch S9 and to the anode of the diode D10. The connection 762 of the switch S9 is connected to the connection 754 of the capacitor C11.

The switch S9 is preferably embodied in the form of an electronic switch, in particular a transistor, a MOSFET, a thyristor, or an IGBT. A suitable triggering mechanism assures that the PFC or boost converter 730 counteracts the capacitive and/or inductive resistances of the circuit (see, e.g., "Power Factor Correction" at http://www.tpub.com/neets/book2/4k.htm).

The "buffer capacitor" C12 is embodied, for example, in the form of an electrolytic capacitor, and includes the connections 763 and 764; the connection 763 of the capacitor C12 is connected to the cathode of the diode D10 and to a first connection of an input of the transformer 740. The connection 764 of the capacitor C12 is connected to the connection 754 of the capacitor C11 and to a second connection of the input of the transformer 740. Consequently, the connections 763 and 764 of the capacitor C12 are connected in parallel to the input of the transformer 740. At the output of the transformer 740, the connections 703 and 704 are supplied (in a controllable fashion) with the converted direct current, in particular in a range from, for example, 3 volts to 48 volts.

The transformer 740 can in particular be embodied in the form of a direct current converter, e.g. a flyback converter, a flow converter, or a push-pull converter.

The unit 720 includes the switch S8, the inductance L9, and the current-limiting diode D9, these components comprising parts of the HF filter. In particular, the inductance L9 is both a component of the HF filter (in connection with the capacitors C10 and C11) and a component of the current-limiting circuit.

With a suitable clock cycle of the switch S8, during the switching-on process, the capacitor C12 can be charged in a controlled fashion, i.e. so that the current does not exceed a predetermined threshold.

Alternatively, the secondary side of the DC/DC converter 740 can be provided with the current-limiting circuit, e.g. as in FIG. 1, in order to prevent short circuits in the power supply.

Figure 8:
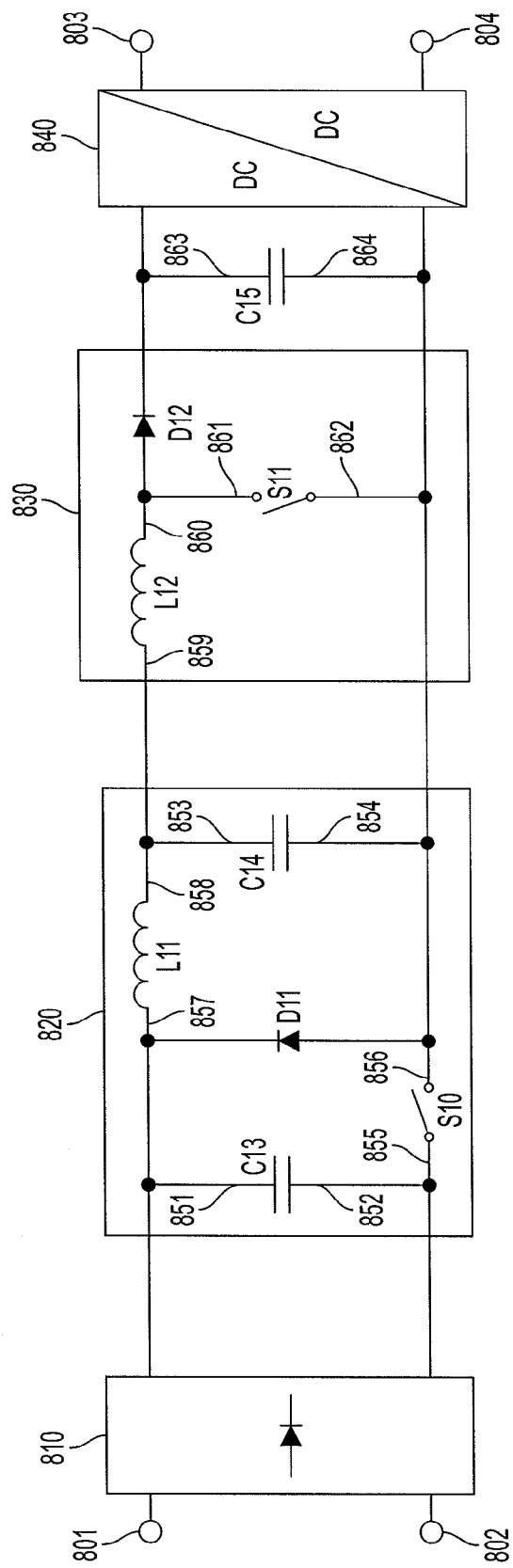
FIG. 8 is a circuit diagram of a power supply equipped with an alternate embodiment of a current-limiting circuit.

FIG. 8 shows an alternate embodiment of a circuit diagram of a power supply equipped with a current-limiting circuit. Some regions of FIG. 8 may correspond to the above-described FIG. 3. In particular, the rectifier 810, the power factor correction 830, the buffer capacitor C15, and the transformer or converter 840 may correspond to their counterpart elements described in conjunction with FIG. 3; the connections 801 and 802 of the input and the connections 803 and 804 of the output may also correspond to the input and output connections described in conjunction with FIG. 3. In such case, the difference in relation to FIG. 3 lies in the detailed wiring of the unit 820, which has an HF filter and a current-limiting circuit, in particular for limiting the switching-on current and for disconnecting transients.

The circuit diagram in FIG. 8 shows an input with the connections 801 and 802 and an output with the connections 803 and 804. The circuit is also provided with a rectifier 810, a filter unit 820 (embodied in the form of an HF filter equipped with a current-limiting circuit), a PFC unit 830 (for example embodied in the form of a boost converter), a capacitor C15 ("buffer capacitor"), embodied, for example, in the form of an electrolytic capacitor, and a transformer or DC/DC converter 840.

The rectifier 810 is connected to the connections 801 and 802 of the input. The rectifier 810 converts the preferably supplied alternating current signal into a direct current signal and transmits it to the HF filter 820 equipped with the current-limiting circuit.

The filter unit 820 includes a capacitor C13 (with connections 851 and 852), a capacitor C14 (with connections 853 and 854), a diode D11, a switch S10 (with connections 855 and 856), and an inductance L11 (with connections 857 and 858).

The capacitor C13 is connected in parallel with the input of the filter unit 820, while the connection 851 of the capacitor C13 is connected to the cathode of the diode D11 and to connection 857 of the inductance L11. The capacitor C14 is connected in parallel to the output of the filter unit 820, while the connection 853 of the capacitor C14 is connected to the connection 858 of the inductance L11. The connection 857 of the inductance L11 is connected to the cathode of the diode D11 and is further connected to the connection 851 of the capacitor C13. The connection 852 of the capacitor C13 is connected through the switch S10 to the anode of the diode D11 and is further connected to the connection 854 of the capacitor C14. This shared connection point is also referred to as node 867 (not shown).

The filter unit 820 may be considered to be a quadripole, i.e. a unit with an input and output—each of which having two connections, in which case the input on the one hand includes an attachment of the connection 852 of the capacitor C13 to the connection 855 of the switch S10 and an attachment of the connection 852 of the capacitor C13—through the switch S10—to the anode of the diode D11 and to the connection 854 of the capacitor C14 (this corresponds to the node 867); the input on the other hand, includes an attachment of the connection 851 of the capacitor C13 to the cathode of the diode D11 and an attachment—through the inductance L11—to the connection 853 of the capacitor C14. The output on the one hand includes an attachment of the connection 858 of the inductance L11 to the connection 853 of the capacitor C14 and on the other hand, includes an attachment to the node 867 (not shown).

The power factor correction unit 830 includes an inductance L12 (with connections 859 and 860), a switch S11 (with connections 861 and 862), and a diode D12.

The connection 859 of the inductance L12 is connected to the connection 853 of the capacitor C14 and to the connection 858 of the inductance L11. The connection 860 of the inductance L12 is connected to the connection 861 of the switch S11 and to the anode of the diode D12. The connection 862 of the switch S11 is connected to the connection 854 of the capacitor C14 (and to the anode of the diode D11, to the connection 852 of the capacitor C13, and to the output of the rectifier 810, and thus to the node 867).

The switch S11 is preferably embodied in the form of an electronic switch, in particular a transistor, a MOSFET, a thyristor, or an IGBT. A suitable triggering mechanism assures that the PFC or boost converter 830 counteracts the capacitive and/or inductive resistances of the circuit (see, e.g., "Power Factor Correction" at http://www.tpub.com/neets/book2/4k.htm).

The "buffer capacitor" C15 is embodied, for example, in the form of an electrolytic capacitor, and includes the connections 863 and 864; the connection 863 of the capacitor C15 is connected to the cathode of the diode D12 and to a first connection of an input of the transformer 840. The connection 864 of the capacitor C15 is connected to the connection 854 of the capacitor C14 and to a second connection of the input of the transformer 840. Consequently, the connections 863 and 864 of the capacitor C15 are connected in parallel to the input of the transformer 840. At the output of the transformer 840, the connections 803 and 804 are supplied (in a controllable fashion) with the converted direct current, in particular in a range from, for example, 3 volts to 48 volts.

The transformer 840 can in particular be embodied in the form of a direct current converter, e.g. a flyback converter, a flow converter, or a push-pull converter.

The unit 820 includes the switch S10, the inductance L11, and the current-limiting diode D11, these components comprising parts of the HF filter. In particular, the inductance L11 is both a component of the HF filter (in connection with the capacitors C13 and C14) and a component of the current-limiting circuit.

With a suitable clock cycle of the switch S10, during the switching-on process, the capacitor C15 can be charged in a controlled fashion, i.e. so that the current does not exceed a predetermined threshold.

Alternatively, the secondary side of the DC/DC converter 840 can be provided with the current-limiting circuit, e.g. as in FIG. 1, in order to prevent short circuits in the power supply.

Figure 9:
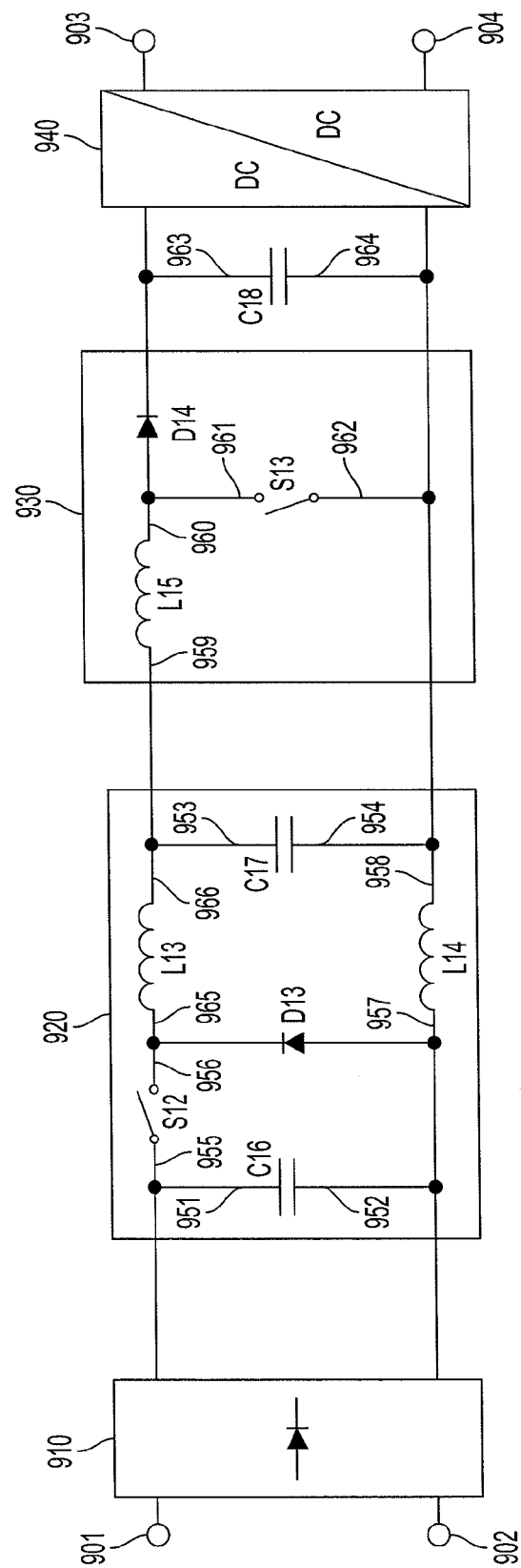
FIG. 9 is a circuit diagram of a power supply equipped with an alternate embodiment of a current-limiting circuit.

FIG. 9 shows an alternate embodiment of a circuit diagram of a power supply equipped with a current-limiting circuit. Some regions of FIG. 9 may correspond to above-described FIGS. 3 and 7. In particular, the rectifier 910, the power factor correction 930, the buffer capacitor C18, and the transformer or converter 940 may correspond to their counterpart elements described in conjunction with FIG. 3 and/or FIG. 7; the connections 901 and 902 of the input and the connections 903 and 904 of the output may also correspond to the input and output connections described in conjunction with FIG. 3 and/or FIG. 7. In such case, the difference in relation to FIGS. 3 and 7 lies in the detailed wiring of the unit 920, which has an HF filter and a current-limiting circuit, in particular for limiting the switching-on current and for disconnecting transients.

The circuit diagram in FIG. 9 shows an input with the connections 901 and 902 and an output with the connections 903 and 904. The circuit is also provided with a rectifier 910, a filter unit 920 (embodied in the form of an HF filter equipped with a current-limiting circuit), a PFC unit 930 (for example embodied in the form of a boost converter), a capacitor C18 ("buffer capacitor"), embodied, for example, in the form of an electrolytic capacitor, and a transformer or DC/DC converter 940.

The rectifier 910 is connected to the connections 901 and 902 of the input. The rectifier 910 converts the preferably supplied alternating current signal into a direct current signal and transmits it to the HF filter 920 equipped with the current-limiting circuit.

The filter unit 920 includes a capacitor C16 (with connections 951 and 952), a capacitor C17 (with connections 953 and 954), a diode D13, a switch S12 (with connections 955 and 956), an inductance L13 (with connections 965 and 966), and an inductance L14 (with connections 957 and 958).

The capacitor C16 is connected in parallel with the input of the filter unit 920, while the connection 951 of the capacitor C16 is connected through the switch S12 to the cathode of the diode D13 and to connection 965 of the inductance L13. The capacitor C17 is connected in parallel to the output of the filter unit 920, while the connection 953 of the capacitor C17 is connected to the connection 966 of the inductance L13. The connection 965 of the inductance L13 is connected to the cathode of the diode D13 and is further connected to the connection 951 of the capacitor C16. The connection 952 of the capacitor C16 is connected to the anode of the diode D13 and is further connected to the connection 957 of the inductance L14. The connection 958 of the inductance L14 is connected to the connection 954 of the capacitor C17. This shared connection point is also referred to as node 967 (not shown); other similar nodes may exist in this embodiment of a current-limiting circuit such as, for example, at the attachment point of the connection 953 of the capacitor C17 to the connection 966 of the inductance L13.

The filter unit 920 may be considered to be a quadripole, i.e. a unit with an input and output—each of which having two connections, in which case the input on the one hand includes an attachment of the connection 952 of the capacitor C16 to the connection 957 of the inductance L14 and an attachment of the connection 952 of the capacitor C16 to the anode of the diode D13 and—through the inductance L14—to the connection 954 of the capacitor C17 (this corresponds to the node 967); the input on the other hand, includes an attachment of the connection 951 of the capacitor C16—through the switch S12—to the cathode of the diode D13 and to the connection 965 of the inductance L13, and an attachment—through the inductance L13—to the connection 953 of the capacitor C17. The output on the one hand includes an attachment of the connection 966 of the inductance L13 to the connection 953 of the capacitor C17 and on the other hand, includes an attachment to the node 967 (not shown).

The power factor correction unit 930 includes an inductance L15 (with connections 959 and 960), a switch S13 (with connections 961 and 962), and a diode D14.

The connection 959 of the inductance L15 is connected to the connection 953 of the capacitor C17 and to the connection 966 of the inductance L13. The connection 960 of the inductance L15 is connected to the connection 961 of the switch S13 and to the anode of the diode D14. The connection 962 of the switch S13 is connected to the connection 954 of the capacitor C17 and to the connection 958 of the inductance L14 (and to the anode of the diode D13, to the connection 952 of the capacitor C16, and to the output of the rectifier 910, and thus to the node 967).

The switch S13 is preferably embodied in the form of an electronic switch, in particular a transistor, a MOSFET, a thyristor, or an IGBT. A suitable triggering mechanism assures that the PFC or boost converter 930 counteracts the capacitive and/or inductive resistances of the circuit (see, e.g., "Power Factor Correction" at http://www.tpub.com/neets/book2/4k.htm).

The "buffer capacitor" C18 is embodied, for example, in the form of an electrolytic capacitor, and includes the connections 963 and 964; the connection 963 of the capacitor C18 is connected to the cathode of the diode D14 and to a first connection of an input of the transformer 940. The connection 964 of the capacitor C18 is connected to the connection 954 of the capacitor C17 and to a second connection of the input of the transformer 940. Consequently, the connections 963 and 964 of the capacitor C18 are connected in parallel to the input of the transformer 940. At the output of the transformer 940, the connections 903 and 904 are supplied (in a controllable fashion) with the converted direct current, in particular in a range from, for example, 3 volts to 48 volts.

The transformer 940 can in particular be embodied in the form of a direct current converter, e.g. a flyback converter, a flow converter, or a push-pull converter.

The unit 920 includes the switch S12, the inductance L13, the inductance L14, and the current-limiting diode D13, these components comprising parts of the HF filter. In particular, the inductance L13 and the inductance L14 are each a component of the HF filter (in connection with the capacitors C16 and C17) and a component of the current-limiting circuit.

With a suitable clock cycle of the switch S12, during the switching-on process, the capacitor C18 can be charged in a controlled fashion, i.e. so that the current does not exceed a predetermined threshold.

Alternatively, the secondary side of the DC/DC converter 940 can be provided with the current-limiting circuit, e.g. as in FIG. 1, in order to prevent short circuits in the power supply.

Figure 10:
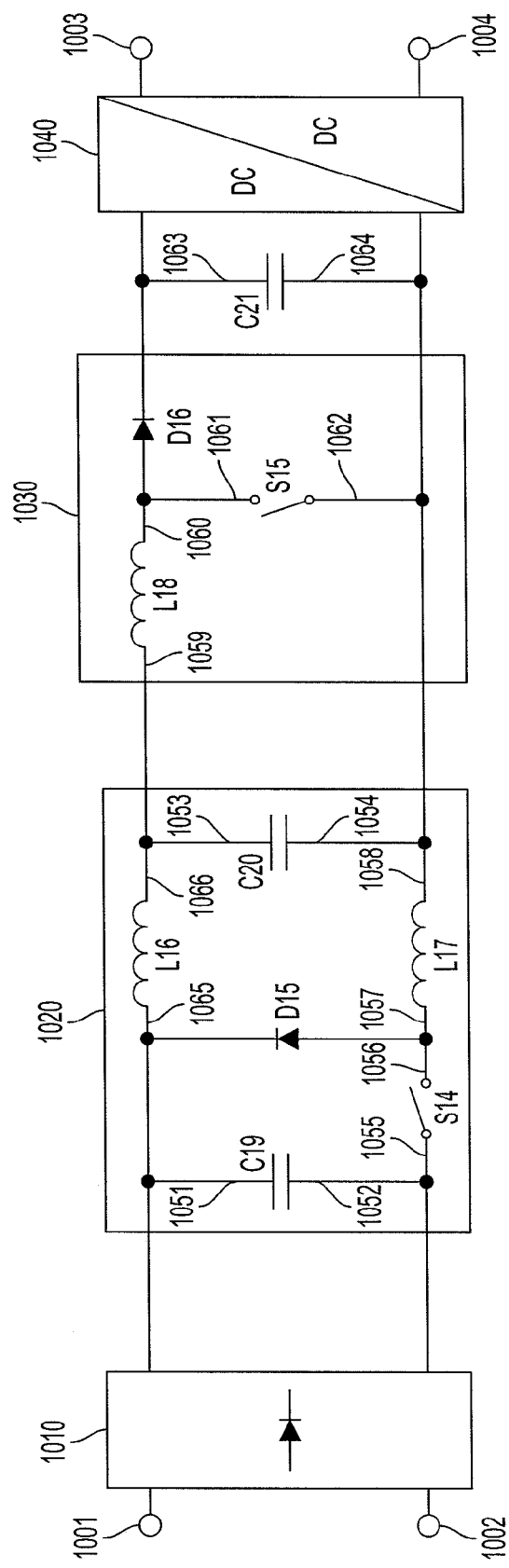
FIG. 10 is a circuit diagram of a power supply equipped with an alternate embodiment of a current-limiting circuit.

FIG. 10 shows an alternate embodiment of a circuit diagram of a power supply equipped with a current-limiting circuit. Some regions of FIG. 10 may correspond to above-described FIGS. 3 and 8. In particular, the rectifier 1010, the power factor correction 1030, the buffer capacitor C21, and the transformer or converter 1040 may correspond to their counterpart elements described in conjunction with FIG. 3 and/or FIG. 8; the connections 1001 and 1002 of the input and the connections 1003 and 1004 of the output may also correspond to the input and output connections described in conjunction with FIG. 3 and/or FIG. 8. In such case, the difference in relation to FIGS. 3 and 8 lies in the detailed wiring of the unit 1020, which has an HF filter and a current-limiting circuit, in particular for limiting the switching-on current and for disconnecting transients.

The circuit diagram in FIG. 10 shows an input with the connections 1001 and 1002 and an output with the connections 1003 and 1004. The circuit is also provided with a rectifier 1010, a filter unit 1020 (embodied in the form of an HF filter equipped with a current-limiting circuit), a PFC unit 1030 (for example embodied in the form of a boost converter), a capacitor C21 ("buffer capacitor"), embodied, for example, in the form of an electrolytic capacitor, and a transformer or DC/DC converter 1040.

The rectifier 1010 is connected to the connections 1001 and 1002 of the input. The rectifier 1010 converts the preferably supplied alternating current signal into a direct current signal and transmits it to the HF filter 1020 equipped with the current-limiting circuit.

The filter unit 1020 includes a capacitor C19 (with connections 1051 and 1052), a capacitor C20 (with connections 1053 and 1054), a diode D15, a switch S14 (with connections 1055 and 1056), an inductance L16 (with connections 1065 and 1066), and an inductance L17 (with connections 1057 and 1058).

The capacitor C19 is connected in parallel with the input of the filter unit 1020, while the connection 1052 of the capacitor C19 is connected through the switch S14 to the anode of the diode D15 and to connection 1057 of the inductance L17. The capacitor C20 is connected in parallel to the output of the filter unit 1020, while the connection 1054 of the capacitor C20 is connected to the connection 1058 of the inductance L17. The connection 1057 of the inductance L17 is connected to the anode of the diode D15 and is further connected to the connection 1052 of the capacitor C19. The connection 1051 of the capacitor C19 is connected to the cathode of the diode D15 and is further connected to the connection 1065 of the inductance L16. The connection 1066 of the inductance L16 is connected to the connection 1053 of the capacitor C20. This shared connection point is also referred to as node 1067 (not shown); other similar nodes may exist in this embodiment of a current-limiting circuit such as, for example, at the attachment point of the connection 1054 of the capacitor C20 to the connection 1058 of the inductance L17.

The filter unit 1020 may be considered to be a quadripole, i.e. a unit with an input and output—each of which having two connections, in which case the input on the one hand includes an attachment of the connection 1051 of the capacitor C19 to the connection 1065 of the inductance L16 and an attachment of the connection 1051 of the capacitor C19 to the cathode of the diode D15 and—through the inductance L16—to the connection 1053 of the capacitor C20 (this corresponds to the node 1067); the input on the other hand, includes an attachment of the connection 1052 of the capacitor C19—through the switch S14—to the anode of the diode D15 and to the connection 1057 of the inductance L17, and an attachment—through the inductance L17—to the connection 1054 of the capacitor C20. The output on the one hand includes an attachment of the connection 1058 of the inductance L17 to the connection 1054 of the capacitor C20 and on the other hand, includes an attachment to the node 1067 (not shown).

The power factor correction unit 1030 includes an inductance L18 (with connections 1059 and 1060), a switch S15 (with connections 1061 and 1062), and a diode D16.

The connection 1059 of the inductance L18 is connected to the connection 1053 of the capacitor C20 and to the connection 1066 of the inductance L16 (and to the cathode of the diode D15, to the connection 1051 of the capacitor C19, and to the output of the rectifier 1010, and thus to the node 1067). The connection 1060 of the inductance L18 is connected to the connection 1061 of the switch S15 and to the anode of the diode D16. The connection 1062 of the switch S15 is connected to the connection 1054 of the capacitor C20 and to connection 1058 of the inductance L17.

The switch S15 is preferably embodied in the form of an electronic switch, in particular a transistor, a MOSFET, a thyristor, or an IGBT. A suitable triggering mechanism assures that the PFC or boost converter 1030 counteracts the capacitive and/or inductive resistances of the circuit (see, e.g., "Power Factor Correction" at http://www.tpub.com/neets/book2/4k.htm).

The "buffer capacitor" C21 is embodied, for example, in the form of an electrolytic capacitor, and includes the connections 1063 and 1064; the connection 1063 of the capacitor C21 is connected to the cathode of the diode D16 and to a first connection of an input of the transformer 1040. The connection 1064 of the capacitor C21 is connected to the connection 1054 of the capacitor C20 and to a second connection of the input of the transformer 1040. Consequently, the connections 1063 and 1064 of the capacitor C21 are connected in parallel to the input of the transformer 1040. At the output of the transformer 1040, the connections 1003 and 1004 are supplied (in a controllable fashion) with the converted direct current, in particular in a range from, for example, 3 volts to 48 volts.

The transformer 1040 can in particular be embodied in the form of a direct current converter, e.g. a flyback converter, a flow converter, or a push-pull converter.

The unit 1020 includes the switch S14, the inductance L16, the inductance L17, and the current-limiting diode D15, these components comprising parts of the HF filter. In particular, the inductance L16 and the inductance L17 are each a component of the HF filter (in connection with the capacitors C19 and C20) and a component of the current-limiting circuit.

With a suitable clock cycle of the switch S14, during the switching-on process, the capacitor C21 can be charged in a controlled fashion, i.e. so that the current does not exceed a predetermined threshold.

Alternatively, the secondary side of the DC/DC converter 1040 can be provided with the current-limiting circuit, e.g. as in FIG. 1, in order to prevent short circuits in the power supply.

Figure 11:
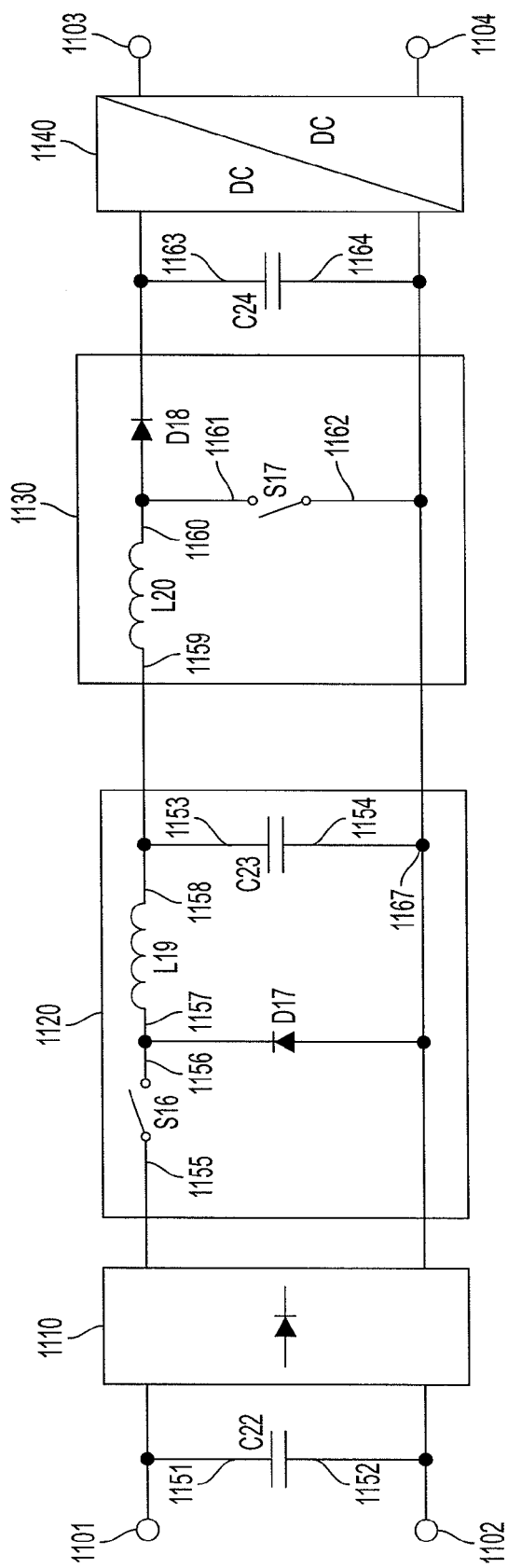
FIG. 11 is a circuit diagram of a power supply equipped with an alternate embodiment of a current-limiting circuit.

FIG. 11 shows an alternate embodiment of a circuit diagram of a power supply equipped with a current-limiting circuit. Some regions of FIG. 11 may correspond to above-described FIG. 3. In particular, the rectifier 1110, the HF filter unit 1120, the power factor correction 1130, the buffer capacitor C24, and the transformer or converter 1140 may correspond to their counterpart elements described in conjunction with FIG. 3; the connections 1101 and 1102 of the input and the connections 1103 and 1104 of the output may also correspond to the input and output connections described in conjunction with FIG. 3. In such case, the difference in relation to FIG. 3 lies in the placement of the capacitor C22 before the rectifier circuit 1110 as shown in FIG. 11.

The input connection 1101 is connected to the connection 1151 of the capacitor C22 and then to an input of the rectifier 1110; the input to filter unit 1120 includes an attachment of the connection 1151 of the capacitor C22 to the connection 1155 of the switch S16. The input connection 1102 is connected to the connection 1152 of the capacitor C22 and then to the input of the rectifier 1110; the input to filter unit 1120 includes an attachment of the connection 1152 to the anode of the diode D17 and to the connection 1154 of the capacitor C23 (this corresponds to a shared node 1167). The output of the unit 1120 is connected to the power factor correction 1130 in a manner corresponding to the description associated with FIG. 3.

The configuration in which the capacitor (e.g., C22) is placed before the rectifier circuit (e.g., 1110) as shown in FIG. 11, may also be applied to other exemplary embodiments of a circuit diagram such as those embodiments shown, for example, in FIGS. 6, 10, 14, and 15.

Figure 12:
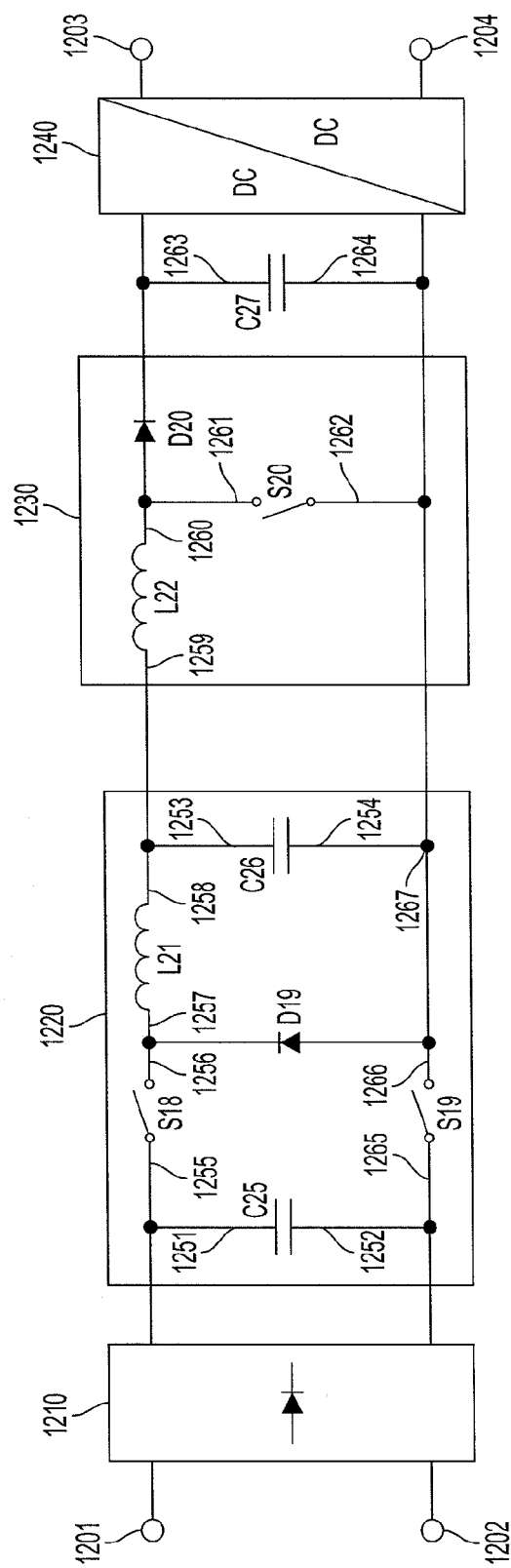
FIG. 12 is a circuit diagram of a power supply equipped with an alternate embodiment of a current-limiting circuit.

FIG. 12 shows an alternate embodiment of a circuit diagram of a power supply equipped with a current-limiting circuit. Some regions of FIG. 12 may correspond to above-described FIGS. 3 and 8. In particular, the rectifier 1210, the power factor correction 1230, the buffer capacitor C27, and the transformer or converter 1240 may correspond to their counterpart elements described in conjunction with FIG. 3 and/or FIG. 8; the connections 1201 and 1202 of the input and the connections 1203 and 1204 of the output may also correspond to the input and output connections described in conjunction with FIG. 3 and/or FIG. 8. In such case, the difference in relation to FIGS. 3 and 8 lies in the detailed wiring of the unit 1220, which has an HF filter and a current-limiting circuit, in particular for limiting the switching-on current and for disconnecting transients.

The filter unit 1220 includes a capacitor C25 (with connections 1251 and 1252), a capacitor C26 (with connections 1253 and 1254), a diode D19, a switch S18 (with connections 1255 and 1256), a switch S19 (with connections 1265 and 1266), and an inductance L21 (with connections 1257 and 1258).

The embodiment as shown in FIG. 12 includes two switches (e.g., S18 and S19), which are driven simultaneously. This configuration may be advantageous in the event of high input voltage to the circuit; particularly in cases where the electric strength of either switch (e.g., S18 or S19) is less than the input voltage.

The input of the unit 1220 is connected to the rectifier 1210 in a manner corresponding to the descriptions associated with FIGS. 3 and/or 8, and the output of the unit 1220 is connected to the power factor correction 1230 in a manner corresponding to the descriptions associated with FIGS. 3 and 8.

Figure 13:
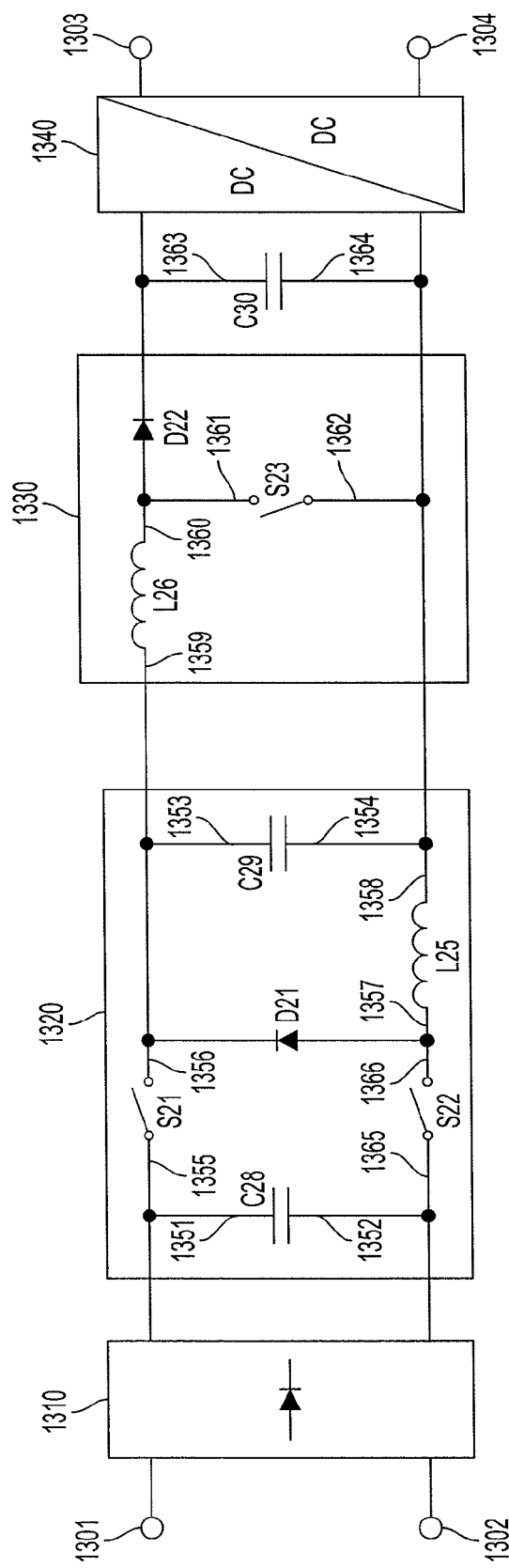
FIG. 13 is a circuit diagram of a power supply equipped with an alternate embodiment of a current-limiting circuit.

FIG. 13 shows an alternate embodiment of a circuit diagram of a power supply equipped with a current-limiting circuit. Some regions of FIG. 13 may correspond to above-described FIGS. 6 and 7. In particular, the rectifier 1310, the power factor correction 1330, the buffer capacitor C30, and the transformer or converter 1340 may correspond to their counterpart elements described in conjunction with FIG. 6 and/or FIG. 7; the connections 1301 and 1302 of the input and the connections 1303 and 1304 of the output may also correspond to the input and output connections described in conjunction with FIG. 6 and/or FIG. 7. In such case, the difference in relation to FIGS. 6 and 7 lies in the detailed wiring of the unit 1320, which has an HF filter and a current-limiting circuit, in particular for limiting the switching-on current and for disconnecting transients.

The filter unit 1320 includes a capacitor C28 (with connections 1351 and 1352), a capacitor C29 (with connections 1353 and 1354), a diode D21, a switch S21 (with connections 1355 and 1356), a switch S22 (with connections 1365 and 1366), and an inductance L25 (with connections 1357 and 1358).

The embodiment as shown in FIG. 13 includes two switches (e.g., S21 and S22), which are driven simultaneously. This configuration may be advantageous in the event of high input voltage to the circuit; particularly in cases where the electric strength of either switch (e.g., S21 or S22) is less than the input voltage.

The input of the unit 1320 is connected to the rectifier 1310 in a manner corresponding to the descriptions associated with FIGS. 6 and/or 7, and the output of the unit 1320 is connected to the power factor correction 1330 in a manner corresponding to the descriptions associated with FIGS. 6 and 7.

Figure 14:
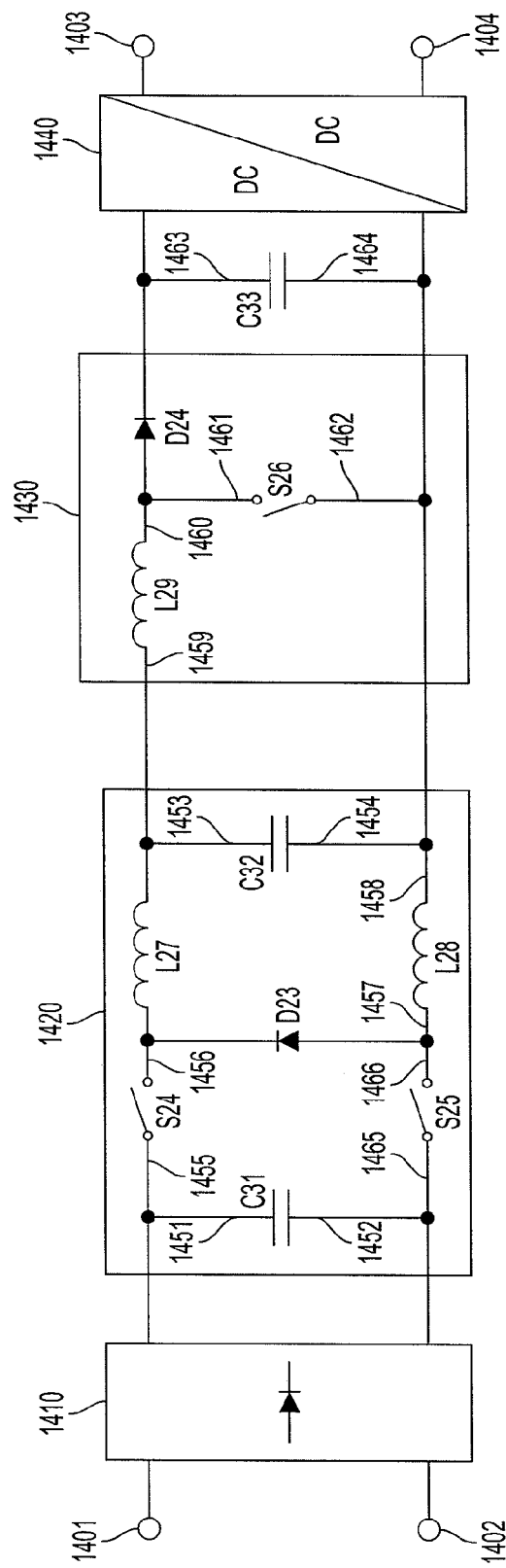
FIG. 14 is a circuit diagram of a power supply equipped with an alternate embodiment of a current-limiting circuit.

FIG. 14 shows an alternate embodiment of a circuit diagram of a power supply equipped with a current-limiting circuit. Some regions of FIG. 14 may correspond to above-described FIGS. 9 and 10. In particular, the rectifier 1410, the power factor correction 1430, the buffer capacitor C33, and the transformer or converter 1440 may correspond to their counterpart elements described in conjunction with FIG. 9 and/or FIG. 10; the connections 1401 and 1402 of the input and the connections 1403 and 1404 of the output may also correspond to the input and output connections described in conjunction with FIG. 9 and/or FIG. 10. In such case, the difference in relation to FIGS. 9 and 10 lies in the detailed wiring of the unit 1420, which has an HF filter and a current-limiting circuit, in particular for limiting the switching-on current and for disconnecting transients.

The filter unit 1420 includes a capacitor C31 (with connections 1451 and 1452), a capacitor C32 (with connections 1453 and 1454), a diode D23, a switch S24 (with connections 1455 and 1456), a switch S25 (with connections 1465 and 1466), an inductance L27, and an inductance L28 (with connections 1457 and 1458).

The embodiment as shown in FIG. 14 includes two switches (e.g., S24 and S25), which are driven simultaneously. This configuration may be advantageous in the event of high input voltage to the circuit; particularly in cases where the electric strength of either switch (e.g., S24 or S25) is less than the input voltage.

The input of the unit 1420 is connected to the rectifier 1410 in a manner corresponding to the descriptions associated with FIGS. 9 and/or 10, and the output of the unit 1420 is connected to the power factor correction 1430 in a manner corresponding to the descriptions associated with FIGS. 9 and 10.

Figure 15:
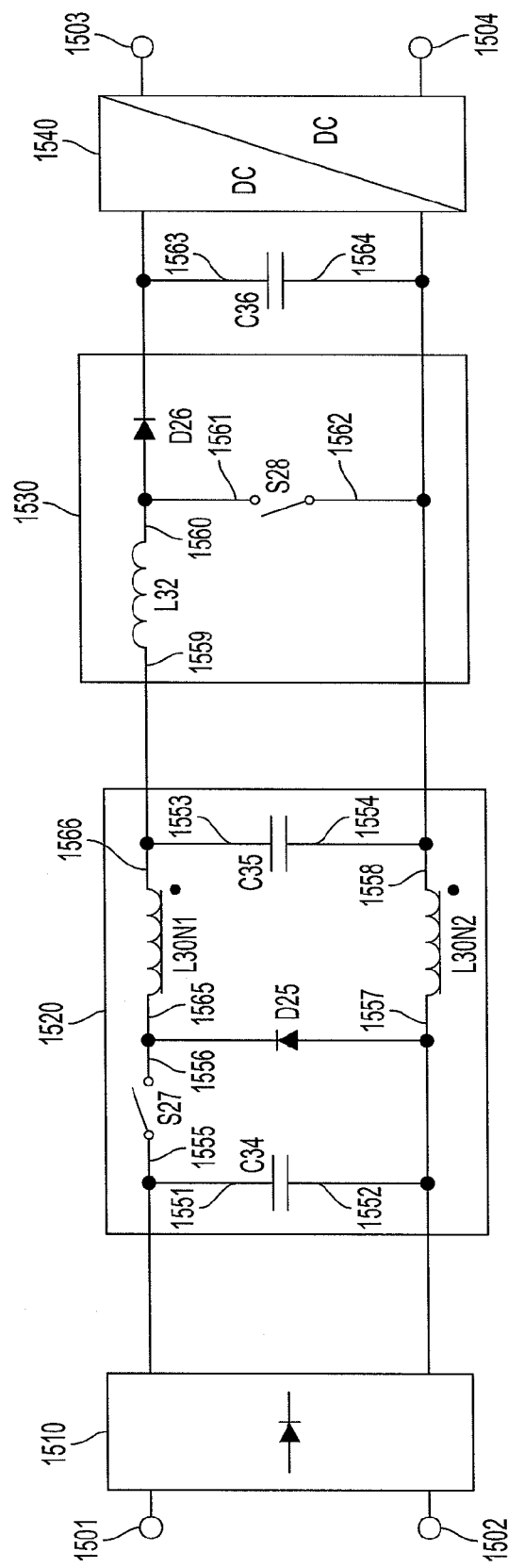
FIG. 15 is a circuit diagram of a power supply equipped with an alternate embodiment of a current-limiting circuit.

FIG. 15 shows an alternate embodiment of a circuit diagram of a power supply equipped with a current-limiting circuit. Some regions of FIG. 15 may correspond to above-described FIG. 9. In particular, the rectifier 1510, the power factor correction 1530, the buffer capacitor C36, and the transformer or converter 1540 may correspond to their counterpart elements described in conjunction with FIG. 9; the connections 1501 and 1502 of the input and the connections 1503 and 1504 of the output may also correspond to the input and output connections described in conjunction with FIG. 9. In such case, the difference in relation to FIG. 9 lies in the detailed wiring of the unit 1520, which has an HF filter and a current-limiting circuit, in particular for limiting the switching-on current and for disconnecting transients.

The filter unit 1520 includes a capacitor C34 (with connections 1551 and 1552), a capacitor C35 (with connections 1553 and 1554), a diode D25, a switch S27 (with connections 1555 and 1556), a primary winding N1 of an inductance L30 (with connections 1565 and 1566), and a secondary winding N2 of the inductance L30 (with connections 1557 and 1558).

The embodiment as shown in FIG. 15 includes an inductance L30N1 and an inductance L30N2, which are one integrated component built on, for example, a single, common core shared by two windings that are inductively coupled. The first inductance L30N1 may correspond to a primary set of windings N1 of the inductance L30, and the second inductance L30N2 may correspond to a secondary set of windings N2 of the inductance L30; the primary set of windings and the secondary set of windings both sharing a single core. Such a configuration may also be applied to other exemplary embodiments of a circuit diagram such as those embodiments shown, for example, in FIGS. 9, 10, and 14.

Figure 16:
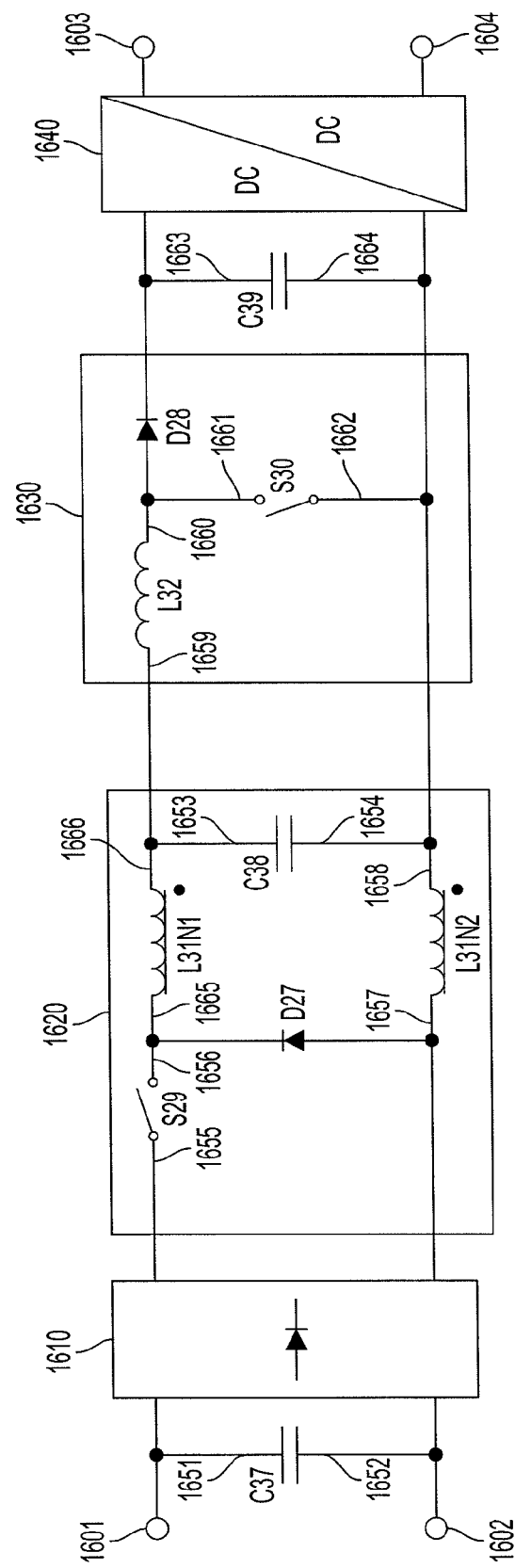
FIG. 16 is a circuit diagram of a power supply equipped with an alternate embodiment of a current-limiting circuit.

FIG. 16 shows an alternate embodiment of a circuit diagram of a power supply equipped with a current-limiting circuit. Some regions of FIG. 16 may correspond to above-described FIGS. 9 and 15. In particular, the rectifier 1610, the HF filter unit 1620, the power factor correction 1630, the buffer capacitor C39, and the transformer or converter 1640 may correspond to their counterpart elements described in conjunction with FIG. 9 and/or FIG. 15; the connections 1601 and 1602 of the input and the connections 1603 and 1604 of the output may also correspond to the input and output connections described in conjunction with FIG. 9 and/or FIG. 15. In such case, the difference in relation to FIGS. 9 and 15 lies in the placement of the capacitor C37 before the rectifier circuit 1610 as shown in FIG. 16.

The input connection 1601 is connected to the connection 1651 of the capacitor C37 and then to an input of the rectifier 1610; the input to filter unit 1620 includes an attachment of the connection 1651 of the capacitor C37 to the connection 1655 of the switch S29. The input connection 1602 is connected to the connection 1652 of the capacitor C37 and then to the input of the rectifier 1610; the input to filter unit 1620 includes an attachment of the connection 1652 to the anode of the diode D27 and to the connection 1657 of the inductance L31N2.

The configuration of placing the capacitor (e.g., C37) before the rectifier circuit (e.g., 1610) as shown in FIG. 16, may also be applied to other exemplary embodiments of a circuit diagram such as those embodiments shown, for example, in FIGS. 9, 10, 14, and 15.

The entire disclosures and contents of each reference, patent, and patent application referred to above are expressly incorporated herein by reference. Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention and any equivalent thereto. It can be appreciated that variations to the present invention would be readily apparent to those skilled in the art, and the present invention is intended to include those alternatives. Further, since numerous modifications will readily occur to those skilled in the art, it is not desired to limit the invention to the exact construction and operation illustrated and described, and accordingly, all suitable modifications and equivalents may be resorted to, falling within the scope of the invention.

What is claimed is:

1. A current-limiting circuit, comprising:
a first switch,
a diode,
an inductance,
an input having a first input connection and second input connection, and
an output having a first output connection and second output connection, the second input connection being connected through the first switch to the inductance and to the anode of the diode and through the inductance to the second output connection,
the cathode of the diode being connected to the first input connection and to the first output connection of the output,
wherein the inductance is a component of a high frequency filter,
wherein the current-limiting circuit is operatively disposed between two capacitors of the high frequency filter,
wherein a first connection of a first capacitor of said two capacitors is connected to the cathode of the diode and is further connected to a second capacitor of said two capacitors via a shared connection node, and a second connection of the first capacitor is connected to the first switch, and
wherein a first connection of the second capacitor is connected to the cathode of the diode and is further connected to the first connection of the first capacitor via the shared connection node, and a second connection of the second capacitor is connected to the inductance.

2. The current-limiting circuit of claim 1 further comprising a second switch,
wherein the cathode of the diode is connected through the second switch to the first input connection of the input, and
wherein the first connection of the first capacitor is connected through the second switch to the cathode of the diode and is further connected to the second capacitor.

3. The current-limiting circuit of claim 1, wherein the first and second input connections of the input are connected, respectively, to the first and second connections of the first capacitor and then for connection to a rectifier circuit.

4. The current-limiting circuit of claim 1, wherein the switch comprises at least one electronic switch.

5. The current-limiting circuit of claim 4, wherein the electronic switch is selected from the group comprising a transistor, a MOSFET, a thyristor, and an IGBT.

6. The current-limiting circuit of claim 1, wherein a resistor is connected between the first switch and a junction of the anode of the diode and a first end of the inductance.

7. The current-limiting circuit of claim 1, wherein the first and second input connections of the input are for connection to a preceding rectifier circuit.

8. The current-limiting circuit of claim 1, wherein an electrolytic capacitor is connected across the first and the second output connections of the output.

9. The current-limiting circuit of claim 8, wherein the first switch is connected so as to cause the electrolytic capacitor to be charged in a clocked fashion, at a clock speed that serves to limit current flow through the circuit.

10. The current-limiting circuit of claim 1, wherein the current-limiting circuit is configured for connection to a power factor correction circuit across the first and the second output connections of the output.

11. The current-limiting circuit of claim 1, wherein the output is configured for connection to a power supply.

12. The current-limiting circuit of claim 11, wherein the power supply is a switched mode power supply.

13. The current-limiting circuit of claim 1, wherein the first switch is operatively connected for clocked current limitation.

14. A current-limiting circuit, comprising:
a first switch,
a diode,
a first inductance, an input having a first input connection and second input connection, and an output having a first output connection and second output connection, the second input connection being connected to the first inductance and to the anode of the diode and through the first inductance to the second output connection, the cathode of the diode being connected to the first input connection through the first switch and to the first output connection of the output, wherein the first inductance is a component of a high frequency filter, wherein the current-limiting circuit is operatively disposed between two capacitors of the high frequency filter, wherein a first connection of a first capacitor of said two capacitors is connected through the first switch to the cathode of the diode and is further connected to a second capacitor of said two capacitors via a shared connection node, and a second connection of the first capacitor is connected to the first inductance, and wherein a first connection of the second capacitor is connected to the cathode of the diode and is further connected through the first switch to the first connection of the first capacitor via the shared connection node, and a second connection of the second capacitor is connected to the first inductance.

15. The current-limiting circuit of claim 14 further comprising a second inductance, wherein the second inductance is a component of the high frequency filter, wherein the cathode of the diode is connected through the second inductance to the first output connection of the output, wherein the first connection of the first capacitor is connected through the second inductance to the second capacitor, and wherein the first connection of the second capacitor is connected through the second inductance to the cathode of the diode.

16. The current-limiting circuit of claim 15, wherein the first inductance and second inductance comprise, respectively, a first set of windings and a second set of windings, the first set of windings and the second set of windings both sharing a single core.

17. The current-limiting circuit of claim 16, wherein the first and second input connections of the input are connected, respectively, to the first and second connections of the first capacitor and then for connection to a rectifier circuit.

18. The current-limiting circuit of claim 15 further comprising a second switch, wherein the second input connection is connected through the second switch to the first inductance and to the anode of the diode, and wherein the second connection of the first capacitor is connected through the second switch to the first inductance.

19. The current-limiting circuit of claim 18, wherein the first inductance and second inductance comprise, respectively, a first set of windings and a second set of windings, the first set of windings and the second set of windings both sharing a single core.

20. The current-limiting circuit of claim 19, wherein the first and second input connections of the input are connected, respectively, to the first and second connections of the first capacitor and then for connection to a rectifier circuit.

21. A current-limiting circuit, comprising:
a first switch,
a diode,
a first inductance,
an input having a first input connection and second input connection, and
an output having a first output connection and second output connection,
the first input connection being connected to the first inductance and to the cathode of the diode and through the first inductance to the first output connection,
the anode of the diode being connected to the second input connection through the first switch and to the second output connection of the output,
wherein the first inductance is a component of a high frequency filter,
wherein the current-limiting circuit is operatively disposed between two capacitors of the high frequency filter,
wherein a first connection of a first capacitor of said two capacitors is connected to the first inductance, and a second connection of the first capacitor is connected through the first switch to the anode of the diode and is further connected to a second capacitor of said two capacitors via a shared connection node, and
wherein a first connection of the second capacitor is connected to the first inductance, and a second connection of the second capacitor is connected to the anode of the diode and is further connected through the first switch to the second connection of the first capacitor via the shared connection node.

22. The current-limiting circuit of claim 21 further comprising a second inductance,
wherein the second inductance is a component of the high frequency filter,
wherein the anode of the diode is connected through the second inductance to the second output connection of the output,
wherein the second connection of the first capacitor is connected through the second inductance to the second connection of the second capacitor, and
wherein the second connection of the second capacitor is connected through the second inductance to the anode of the diode.

23. The current-limiting circuit of claim 22, wherein the first inductance and second inductance comprise, respectively, a first set of windings and a second set of windings, the first set of windings and the second set of windings both sharing a single core.

24. The current-limiting circuit of claim 23, wherein the first and second input connections of the input are connected, respectively, to the first and second connections of the first capacitor and then for connection to a rectifier circuit.

25. The current-limiting circuit of claim 21 further comprising a second switch,
wherein the cathode of the diode is connected through the second switch to the first input connection of the input, and
wherein the first connection of the first capacitor is connected through the second switch to the cathode of the diode and is further connected to the first inductance.

26. A method for triggering a current-limiting circuit including a first switch, a diode, a first inductance, an input having a first input connection and second input connection, and an output having a first output connection and second output connection; the second input connection being connected to the first inductance and to the anode of the diode and through the first inductance to the second output connection, the cathode of the diode being connected to the first input connection through the first switch and to the first output connection of the output, the first inductance being a component of a high frequency filter, and the current-limiting circuit being operatively disposed between two capacitors of the high frequency filter;

the method comprising connecting the output to a power supply, and opening the first switch when a predetermined voltage threshold at the current-limiting circuit input is exceeded, wherein a first connection of a first capacitor of said two capacitors is connected through the first switch to the cathode of the diode and is further connected to a second capacitor via a shared connection node, and a second connection of the first capacitor is connected to the first inductance, and wherein a first connection of the second capacitor is connected to the cathode of the diode and is further connected through the first switch to the first connection of the first capacitor via the shared connection node, and a second connection of the second capacitor is connected to the first inductance.

27. The method of claim 26, further comprising measuring an instantaneous current through a resistor connected in series with the first switch and controlling the first switch in response to the measured current.

28. The method of claim 26, wherein the first switch is closed and reopened at a predetermined clock speed.

29. The method of claim 28, wherein the predetermined clock speed is a frequency in a range from 1 KHz to 1 MHz.

30. The method of claim 26, further comprising deriving a pulse from the group comprising the first switch, at least one pulse generator, at least one Schmitt trigger, and at least one comparator, and triggering the first switch using the derived pulse.

31. A current-limiting circuit, comprising:
a first switch,
a diode,
an inductance,
an input having a first input connection and second input connection, and
an output having a first output connection and second output connection,
the first input connection being connected through the first switch to the inductance and to the cathode of the diode and through the inductance to the first output connection,
the anode of the diode being connected to the second input connection and to the second output connection of the output, wherein the inductance is a component of a high frequency filter, wherein the current-limiting circuit is operatively disposed between two capacitors of a high frequency filter, wherein a first connection of a first capacitor is connected to the first switch, and a second connection of the first capacitor is connected to the anode of the diode and is further connected to a second capacitor via a shared connection node, and wherein a first connection of the second capacitor is connected to the inductance, and a second connection of the second capacitor is connected to the anode of the diode and is further connected to the second connection of the first capacitor via a shared connection node.

32. The current-limiting circuit of claim 31, wherein the first and second input connections of the input are connected, respectively, to the first and second connections of the first capacitor and then for connection to a rectifier circuit.

33. The current-limiting circuit of claim 31, wherein the switch comprises at least one electronic switch.

34. The current-limiting circuit of claim 31, wherein a resistor is connected between the first switch and a junction of the cathode of the diode and a first end of the inductance.

35. The current-limiting circuit of claim 31, wherein the first and second input connections of the input are connected to a preceding rectifier circuit.

36. The current-limiting circuit of claim 31, wherein an electrolytic capacitor is connected across the first and the second output connections of the output.

37. The current-limiting circuit of claim 31, wherein a power factor correction circuit is connected across the first and the second output connections of the output.

38. The current-limiting circuit of claim 31, wherein the output is connected to a power supply.

39. The current-limiting circuit of claim 31, wherein the switch is operatively connected for clocked current limitation.

* * * * *